US012530821B2

United States Patent
Costin et al.

(10) Patent No.: US 12,530,821 B2
(45) Date of Patent: Jan. 20, 2026

(54) NEURAL COMPOSITING BY EMBEDDING GENERATIVE TECHNOLOGIES INTO NON-DESTRUCTIVE DOCUMENT EDITING WORKFLOWS

(71) Applicant: ADOBE INC., San Jose, CA (US)

(72) Inventors: Alexandru Vasile Costin, Monte Sereno, CA (US); Oliver Brdiczka, San Jose, CA (US); Aliakbar Darabi, Newcastle, WA (US); Davis Taylor Brown, Seattle, WA (US); David Davenport Bourgin, Brooklyn, NY (US)

(73) Assignee: ADOBE INC., San Jose, CA (US)

( * ) Notice: Subject to any disclaimer, the term of this patent is extended or adjusted under 35 U.S.C. 154(b) by 389 days.

(21) Appl. No.: 18/188,671

(22) Filed: Mar. 23, 2023

(65) Prior Publication Data

US 2024/0135611 A1    Apr. 25, 2024

Related U.S. Application Data

(60) Provisional application No. 63/379,806, filed on Oct. 17, 2022.

(51) Int. Cl.
| | |
|---|---|
| *G06T 11/60* | (2006.01) |
| *G06T 3/40* | (2006.01) |
| *G06T 5/50* | (2006.01) |
| *G06V 10/82* | (2022.01) |

(52) U.S. Cl.
CPC ............. *G06T 11/60* (2013.01); *G06T 3/40* (2013.01); *G06T 5/50* (2013.01); *G06V 10/82* (2022.01); *G06T 2207/20081* (2013.01); *G06T 2207/20221* (2013.01)

(58) Field of Classification Search
CPC ... G06T 11/60; G06T 3/40; G06T 5/50; G06T 2207/20081; G06T 2207/20221; G06V 10/82
See application file for complete search history.

(56) References Cited

U.S. PATENT DOCUMENTS

| | | | |
|---|---|---|---|
| 2023/0042221 A1* | 2/2023 | Xu | ............ G06N 3/047 |
| 2023/0394820 A1* | 12/2023 | Kutylov | ............ G06F 16/783 |

OTHER PUBLICATIONS

Aneja, et al, "Deep Image Compositing", arXiv preprint: arXiv:2103.15446v1 [cs.CV] Mar. 29, 2021, 4 pages.

(Continued)

*Primary Examiner* — Chong Wu
(74) *Attorney, Agent, or Firm* — F. CHAU & ASSOCIATES, LLC

(57) ABSTRACT

One or more aspects of the method, apparatus, and non-transitory computer readable medium include obtaining an original image, a scene graph describing elements of the original image, and a description of a modification to the original image. The one or more aspects further include updating the scene graph based on the description of the modification. The one or more aspects further include generating a modified image using an image generation neural network based on the updated scene graph, wherein the modified image incorporates content based on the original image and the description of the modification.

20 Claims, 14 Drawing Sheets

(56) References Cited

OTHER PUBLICATIONS

Avrahami, et al, "Blended Diffusion for Text-driven Editing of Natural Images", arXiv preprint: arXiv:2111.14818v1 [cs.CV] Nov. 29, 2021, 32 pages.
Avrahami, et al, "Blended Diffusion for Text-driven Editing of Natural Images", arXiv preprint: arXiv:2111.14818v2 [cs.CV] Mar. 28, 2022, 32 pages.
Chen, et al, "Toward Realistic Image Compositing with Adversarial Learning," 2019 IEEE/CVF Conference on Computer Vision and Pattern Recognition (CVPR), 2019, pp. 8415-8424, doi: 10.1109/CVPR.2019.00861, 10 pages.
Dhariwal, et al, "Diffusion Models Beat GANs on Image Synthesis", arXiv preprint: arXiv:2105.05233v4 [cs.LG] Jun. 1, 2021, 44 pages.
Filimonov, et al, "Neural Composition: Learning to Generate from Multiple Models", arXiv preprint: arXiv:2007.16013v2 [cs.CL] Nov. 9, 2020, 10 pages.
Ho, et al, "Classifier-Free Diffusion Guidance", arXiv preprint: arXiv:2207.12598v1 [cs.LG] Jul. 26, 2022, 14 pages.
Johnson et al, "Image Retrieval using Scene Graphs," 2015 IEEE Conference on Computer Vision and Pattern Recognition (CVPR), 2015, pp. 3668-3678, doi: 10.1109/CVPR.2015.7298990, 11 pages.
Kim, et al, "DiffusionCLIP: Text-Guided Diffusion Models for Robust Image Manipulation", arXiv preprint: arXiv:2110.02711v6 [cs.CV] Aug. 11, 2022, 28 pages.
Li, et al, "Controllable Text-to-Image Generation", arXiv preprint: arXiv:1909.07083v2 [cs.CV] Dec. 19, 2019, 11 pages.
Nichol, et al, "GLIDE: Towards Photorealistic Image Generation and Editing with Text-Guided Diffusion Models", arXiv preprint: arXiv:2112.10741v3 [cs.CV] Mar. 8, 2022, 20 pages.
Radford, et al, "Learning Transferable Visual Models From Natural Language Supervision", arXiv preprint: arXiv:2103.00020v1 [cs.CV] Feb. 26, 2021, 48 pages.
Ramesh, et al, "Zero-Shot Text-to-Image Generation", arXiv preprint: arXiv:2102.12092v2 [cs.CV] Feb. 26, 2021, 20 pages.
Rombach, et al, "High-Resolution Image Synthesis with Latent Diffusion Models", arXiv preprint: arXiv:2112.10752v2 [cs.CV] Apr. 13, 2022, 45 pages.
Saharia, et al, "Photorealistic Text-to-Image Diffusion Models with Deep Language Understanding", arXiv preprint: arXiv:2205.11487v1 [cs.CV] May 23, 2022, 46 pages.
Tov, et al, "Designing an Encoder for StyleGAN Image Manipulation", arXiv preprint: arXiv:2102.02766v1 [cs.CV] Feb. 4, 2021, 33 pages.
Witteveen, et al, "Investigating Prompt Engineering in Diffusion Models", arXiv preprint: arXiv:2211.15462v1 [cs.CV] Nov. 21, 2022, 11 pages.
Zhang, et al, "Deep Image Compositing", arXiv preprint: arXiv:2011.02146v1 [cs.CV] Nov. 4, 2020, 10 pages.

* cited by examiner

NEURAL COMPOSITING BY EMBEDDING GENERATIVE TECHNOLOGIES INTO NON-DESTRUCTIVE DOCUMENT EDITING WORKFLOWS

CROSS-REFERENCE TO RELATED APPLICATION

This application claims priority under 35 U.S.C. 119 to U.S. Provisional Patent Application No. 63/379,806, to Costin, et al., filed on Oct. 17, 2022, the entire contents of which is expressly incorporated herein by reference.

BACKGROUND

The present disclosure relates to blending digital image editing tools with generative imaging into a coherent, non-destructive workflow.

A diffusion model is a parameterized Markov chain trained using variational inference to produce samples matching the data after finite time. Diffusion models utilize a noise map and a denoising operation to generate images. The diffusion model includes a forward process that destroys the input data (e.g., digital image) through a series of steps that adds noise to the data, that is the Markov chain adds Gaussian noise to the data until the initial signal is destroyed. The forward process can be followed by a backward process that reconstructs an image through a trained denoising process. Diffusion models have been built from a hierarchy of denoising autoencoders, and belong to the class of likelihood-based models.

SUMMARY

Embodiments of the present disclosure provide a machine learning model utilizing generative models that can be utilized within a creative visual editor to interact with and integrate the products of a generative model into a traditional creative workflow. Digital image editing tools can be blended with generative imaging into one coherent workflow.

A method, apparatus, and non-transitory computer readable medium for neural compositing are described. One or more aspects of the method, apparatus, and non-transitory computer readable medium include obtaining an original image, a scene graph describing elements of the original image, and a description of a modification to the original image, updating the scene graph based on the description of the modification, and generating a modified image using an image generation neural network based on the updated scene graph, wherein the modified image incorporates content based on the original image and the description of the modification.

An apparatus and method for neural compositing are described. One or more aspects of the apparatus and method include one or more processors; a memory storing instructions and in electronic communication with the processor, the processor being configured to execute the instructions to: obtain an original image, a scene graph describing elements of the image, and a description of a modification to the image, update the scene graph based on the description of the modification, and generate a modified image using an image generation neural network based on the scene graph, wherein the modified image incorporates content based on the original image and the description of the modification.

DETAILED DESCRIPTION

Figure 1:
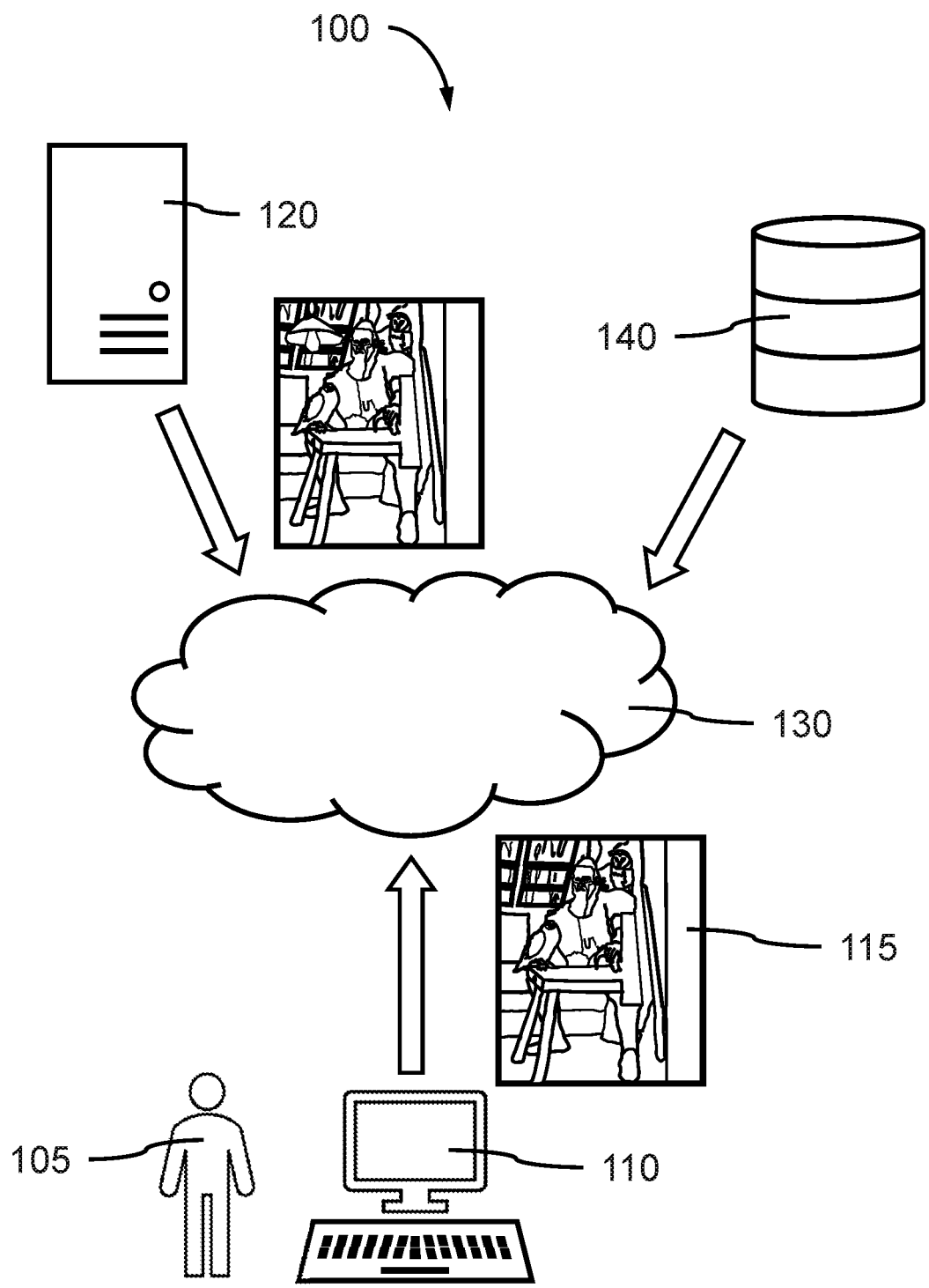
FIG. 1 shows an example of a system for image editing, according to aspects of the present disclosure.

The present disclosure relates to compositing involving combining multiple object images together in a scene image, where the different images can be foreground objects or background objects. One or more of the images can be generated from scratch using a generative model. In some cases, other images can be provided by the user. In some cases, other images can be generated by a model starting with a user image.

A method for image generation is described. One or more aspects of the method include identifying an original image including original content and a description indicating additional content to be added to the original image, generating a first new image using a text-to-image diffusion model based on the description for incorporation into the original image, and generating an output image including the original content from the original image and the first new image.

In various embodiments of neural compositing, a machine learning model can be utilized within a creative visual editor. A machine-learning-model agnostic, dynamic, context-sensitive, and personalized approach to using generative models can be utilized within a creative visual editor. The tool may be used for representing, interacting with, and integrating the products of a generative model into a traditional creative workflow. The tool can be compatible with various generative models, for example, a variational autoencoder (VAE), generative adversarial network (GAN), or diffusion model (DM).

Accordingly, embodiments of the disclosure improve on conventional image editing technology by enabling iterative, non-destructive image modification that incorporates the image generation capabilities of a generative machine learning model. Furthermore, by using a neural scene graph that links text-to-image prompts, image generation seeds and word clouds of the prompts, semantic consistency can be maintained between image edits. Because the outputs of the generative model can be conditioned on their relationships with other elements in the composition, a user can adjust the extent of variations during element resampling, while maintaining image continuity.

Network Architecture

One or more aspects of the apparatus and method include one or more processors; a memory coupled to and in communication with the one or more processors, wherein the memory includes instructions executable by the one or more processors to perform operations including: identifying an original image including original content and a description indicating additional content to be added to the original image, generating a first new image using a text-to-image diffusion model based on the description for incorporation into the original image, and generating an output image including the original content from the original image and the first new image.

In various embodiments, one or more images can be generated using a generational model (e.g., VAE, DM, GAN, etc.) in response to a user's inputted description. The generated image can be of an object to be inserted into a scene including the original image and other previously generated images to form a composite image. The appearance of the generated images are kept consistent through regeneration by using a scene graph and seed values.

FIG. 1 shows an example of a system for image editing, according to aspects of the present disclosure.

In various embodiments, an image editing system 100 can involve a user 105 who can interact with image editing software on a user device 110. The user device 110 communicates with an image editing apparatus 120, which can be a server located on the cloud 130. The image editing apparatus 120 generates modified components to include in the image 115 based on a scene graph.

Embodiments of the disclosure can be implemented in a server operating from the cloud 130, where the cloud is a computer network configured to provide on-demand availability of computer system resources, such as data storage and computing power. In some examples, the cloud 130 provides resources without active management by the user 105. The term cloud is sometimes used to describe data centers available to many users over the Internet. Some large cloud networks have functions distributed over multiple locations from central servers. A server is designated an edge server if the server has a direct or close connection to a user. In some cases, a cloud 130 is limited to a single organization. In other examples, the cloud 130 is available to many organizations. In an example, a cloud 130 includes a multi-layer communications network comprising multiple edge routers and core routers. In another example, a cloud 130 is based on a local collection of switches in a single physical location.

In various embodiments, the functions of the image editing apparatus 120 can be located on or performed by the user device 110. Images and other resources for obtaining or editing the image 115 can be stored on a database 140. User device 110 may be a personal computer, laptop computer, mainframe computer, palmtop computer, personal assistant, mobile device, or any other suitable processing apparatus. In some non-limiting examples, user device 110 includes software that incorporates an image generation application. In some examples, the image generation application on user device 110 may include functions of image editing apparatus 120.

In various embodiments, a user interface may enable user 105 to interact with user device 110. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

In various embodiments, an image editing apparatus 120 can include a computer implemented network comprising a user interface, a machine learning model, which can include a diffusion model. Image editing apparatus 120 can also include a processor unit, a memory unit, a transformer/encoder, a mask component, a noise component, and a training component. The training component can be used to train the machine learning model. Additionally, image editing apparatus 120 can communicate with database 140 via cloud 130. In some cases, the architecture of the image generation neural network is also referred to as a network or a network model. The image generation neural network can be trained to generate a modified image using a diffusion training technique. Further detail regarding the architecture of image editing apparatus 120 is provided for example with reference to FIGS. 4, 5, and 14. Further detail regarding the operation of image editing apparatus 120 is provided, for example, with reference to FIGS. 2-3 and 5-13.

In various embodiments, image editing apparatus 120 is implemented on a server. A server provides one or more functions to users linked by way of one or more networks. In some cases, the server can include a single microprocessor board, which includes a microprocessor responsible for controlling aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 130 can be a computer network configured to provide on-demand availability of computer system resources, such as data storage and computing power. In some examples, cloud 130 provides resources without active management by user 105. The term "cloud" is sometimes used to describe data centers available to many users (e.g., user 105) over the Internet. Some large cloud networks have functions distributed over multiple locations from central servers. A server is designated an edge server if the server has a direct or close connection to a user (e.g., user 105). In some cases, cloud 130 is limited to a single organization. In other examples, cloud 130 is available to many organizations. In an example, cloud 130 includes a multi-layer communications network comprising multiple edge routers and core routers. In another example, cloud 130 is based on a local collection of switches in a single physical location.

Database 140 is an organized collection of data, where for example, database 140 can store data in a specified format known as a schema. Database 140 may be structured as a single database, a distributed database, multiple distributed databases, or an emergency backup database. In some cases, a database controller may manage data storage and processing in database 140. In some cases, a user 105 interacts with the database controller. In other cases, a database controller may operate automatically without user interaction.

Figure 2:
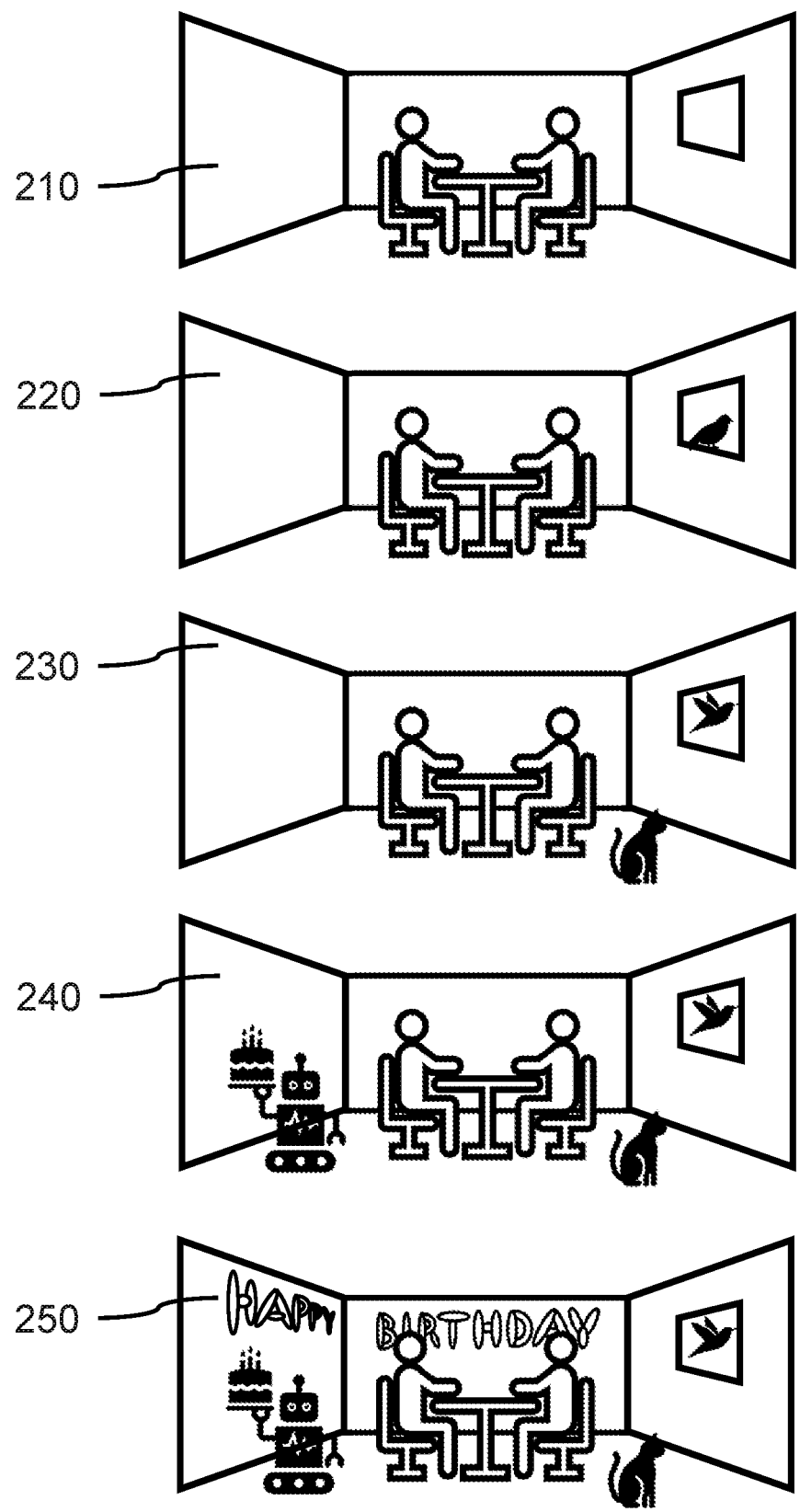
FIG. 2 shows a flow diagram illustrating an example of an original image and several modified images generated using the systems and methods, according to aspects of the present disclosure.

FIG. 2 shows a flow diagram illustrating an example of an original image and several modified images generated using the systems and methods, according to aspects of the present disclosure.

At operation 210, an original image can be generated of two people sitting at a table in a room with one window located on the right side of the room.

At operation 220, a bird object is added to the scene of the original image, where the user describes the bird as an average sized bird perched in the window of the room. The bird object can be introduced to the scene image using a text prompt that describes the bird.

At operation 230, the user adds a cat object to the scene image, where the user describes the cat as a house cat sitting on the floor looking at the bird. The addition of the cat object can cause resampling of the bird object using a saved seed value, such that the appearance of the bird remains the same, but the bird changes from perching in the window to flying because a bird would not remain still in the presence of the cat.

In various embodiments, a seed is a numerical value used for the random generation of the image by the generator model. Without a stored seed value, each time an image was generated for the same object, the image itself would differ due to the inherent random nature of the generation process. The stored seed value helps to retain the features of the previously generated image when the image is subsequently regenerated to account for changes in the scene. The seed value can control the various aspects of the generated image.

At operation 240, the user adds a robot object and birthday cake object, where the robot is described as carrying the birthday cake to the two people sitting at the table. The addition of the robot and birthday cake can cause the two people to be resampled using a seed value, such that the people remain sitting at the table, but their expressions change from serious to celebratory. The robot and cake may or may not effect changes to the cat or bird.

At operation 250, the user adds an object made up of a group of characters that reads "Happy" to the left wall and "Birthday" to the back wall, while specifying a prompt of "balloons" for the description. The characters can be rendered correctly in perspective and create "Happy Birthday" objects made of balloons that are placed in the scene.

Other additional additions of objects and changes to the scene may be incorporated by editing the previous descriptions or adding new object descriptions. Saved seed values can be used to maintain and regenerate the previously added objects.

In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations.

Figure 3:
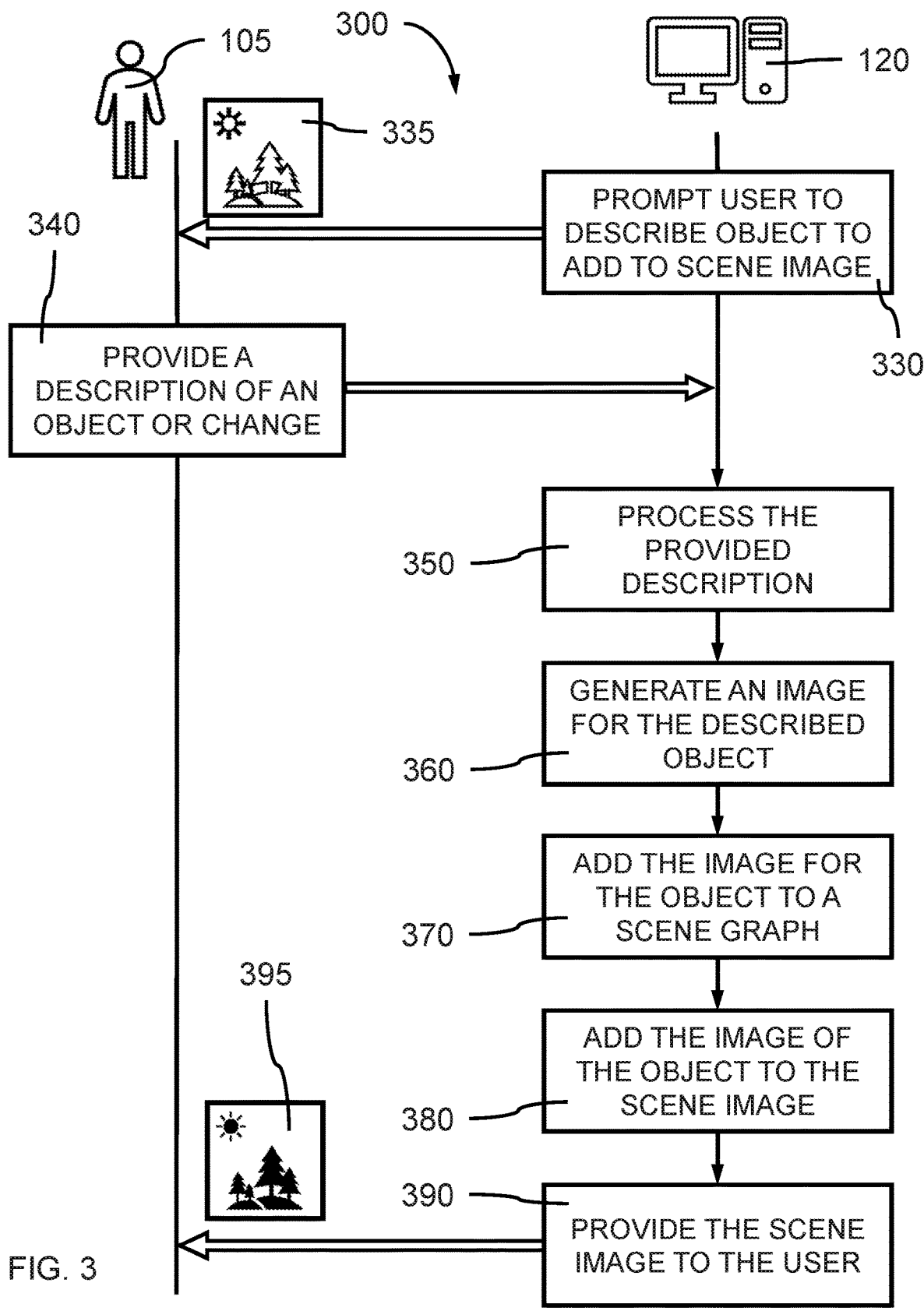
FIG. 3 shows a flow diagram of a method for neural compositing by image generation using generative models, according to aspects of the present disclosure.

FIG. 3 shows a flow diagram of a method for neural compositing by image generation using generative models, according to aspects of the present disclosure.

In one or more embodiments, a neural compositing method 300 utilizing image generation using generative models is provided. In various embodiments, a user 105 can interact with an image editing apparatus 120 (i.e., a computer system) to generate an output scene image 395.

At operation 330, the computer system can provide the user 105 with an original image 335, and prompt the user to provide a description of an object to be included in the original image or to provide a description of changes to the original image 335. The original image 335 can be a background scene including minimal features into which the user 105 can introduce one or more objects. In various embodiments, the user 105 can provide an initial description to the image editing apparatus 120 to be used to generate the original image 335. A description can also be of a modification to the original image 335.

In various embodiments, scene generation can begin with an original image 335 containing one or more elements (e.g., objects, background features, texture, etc.), for example, an inside of a wooden hut having bare brown, wooden walls and a thatched roof, or a grassy clearing in a forest with blue sky showing through the tree branches, and a monolith in the center of the clearing.

At operation 340, the user 105 can provide a description of an object to be introduced to the original image 335 or a description of a change to be made to the original image 335. For example, the user can provide a description of a person (e.g., hiker, warrior, wizard, etc.), a creature (e.g., dragon, troll, etc.), an animal (e.g., deer, bear, owl, etc.), or an inanimate object (e.g., table, totem, monolith, car, etc.) to be included in the original image 335. The description can include one or more attributes of the object or scene feature and one or more relationships of the object with other feature(s) in the scene image. For example, a person object, a table object, and a lamp object, each having described attributes, can be added to the inside of the wooden hut. As an example, the user 105 can specify the base color of the generated object (e.g., red car, black bear, etc.) The user 105 may provide a mask to guide the generation or provide another image to get style inspiration from. The user 105 can also change the original image 335, for example, from a forest to a beach or a mountain setting, or change trees in the original image 335, for example, from oak trees to pine trees.

In various embodiments, a modified image can be generated using an image generation neural network based on a scene graph, wherein the modified image incorporates content based on the original image and the description of the modification.

In various embodiments, one or more of the generated images can be altered in response to other objects or changes introduced into the scene. For example, a user may generate an image of a person (e.g., bar keep, wizard, barbarian, etc.) added to the scene as a background object, for example, in a default standing position, and an image of a wooden table added to the scene as a foreground object, where the addition of the wooden table can result in the image of the person changing from the default standing position to a sitting position behind the wooden table. The addition of another object, for example, an oil lamp, to the scene, can then change the lighting (e.g., illumination level, shading, and shadowing) of the person and/or the table, and any other objects, depending on the brightness and positioning of the lamp.

In various embodiments, the description of the object or scene change can be provided by the user 105 in a natural language, that can be interpreted by a natural language processor. The description can be inputted into the image editing apparatus 120 for analysis and interpretation. The relative depth of the objects can be determined by the image editing apparatus 120.

At operation 350, the image editing apparatus 120 can process the received description and analyze the description using a language model (LM) or natural language processor (NLP). In various embodiments, the NLP can analyze the description and generate a representation of the description. For example, text may be converted into a vector or a series of vectors using a transformer model, or a multi-modal encoder. In various embodiments, the encoder for the conversion is trained independently of the generative model.

In various embodiments, the NLP can be a transformer type natural language processor/neural language model (e.g., GPT), an encoder based natural language processor (e.g., Bidirectional Encoder Representations from Transformers (BERT), Robustly Optimized BERT (RoBERTa)), or other encoder/decoder based NLP.

A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important.

The attention mechanism involves query, keys, and values denoted by Q, K, and V, respectively. Q is a matrix that contains the query (vector representation of one word in the sequence), K represents all the keys (vector representations of all the words in the sequence), and V is the values, which is the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights, a.

At operation 360, the generative model can generate an image of the object based on the vector or a series of vectors, where the generative model could be a diffusion model. The system can generate an image based on a noise map and a conditional guidance vector, while taking into account other conditions provided by the user. For example, the image may be generated using a reverse diffusion process.

Diffusion models trained using a large amount of data and computational resources have caused qualitative development in text-guided image generation. In some examples, the diffusion models are trained to map from random noise and a text prompt. However, in some examples, image synthesis and editing may be performed using stochastic differential equations that combine noise with an input image at different weights, resulting in a modified version of the input image rather than a novel or random image. Image editing with stochastic differential equations may be used to turn rough brushstrokes into photorealistic images. Additionally, such techniques may be used to modify existing images without inputting any brushstrokes.

In various embodiments, a noise map that includes random noise can be initialized. The noise map may include pixels from the original image 335, and noise in a region to be edited. The noise map may be in a pixel space or a latent space. The seed can be a noise map, where using the same seed generates a similar image. By initializing an image with random noise, different variations of an image including the content described by the user 105 can be generated. One particularly useful technique is to generate noise starting from the base color to guide the generation process to create pixels that will be close to the provided base color.

Examples of the diffusion model can utilize an anchor prompt and a guidance prompt for guidance. Examples also include a dampened resampling method. The anchor prompting technique can result in the conditional guidance focusing on the adjective or prepositional phrase that describe a desired edit. Dampened resampling increases the realism of details within an object being edited. Additionally, dampened resampling increases harmonization with the background in an image. The anchor prompting and dampened resampling method can generalize to diffusion models without alteration to enhance diffusion models sampling.

Inpainting is an image editing capability that enables users to modify regions of an image and replace those regions with generated content from the diffusion model. Tools can enable changes within an image (e.g., real-world images or generated images) by erasing or applying a mask to a specific region or portion of the image, and then asking the model to fill in the masked region of the image with new content. The model references surrounding pixels to ensure that the generated object(s) fit the original image.

In various embodiments, the neural compositing (also referred to as a scene generation process) is compatible with any of the generative models (VAE, DM, GAN, etc.). The generative model can be a black box, where the generative process and image insertion is model agnostic, such that the particular generative model can be swapped out without altering the scene generation process (neural compositing).

Diffusion models are a type of generative model that can convert Gaussian noise into image samples from a learned data distribution through an iterative denoising process that decreases the noise content of the image. To accomplish this, the diffusion model is trained based on a denoising objective.

In a non-limiting exemplary embodiment, the image generation tool is a text-to-image diffusion model, where a transformer language model used for understanding text can be implemented with diffusion models for high-fidelity image generation. An encoder can be used to map input text into a sequence of embeddings, and the diffusion models can map these embeddings to images. The diffusion models can be conditioned on the text embedding sequence for image-text alignment. Text encoders may be trained on text only corpus or on paired image-text data. The transformer language model can be/include a pretrained text encoder. In some examples, a graph neural network can be used to encode context for elements into the embedding of the individual elements based on the scene graph.

In a non-limiting exemplary embodiment, a generated image can be conditioned on multiple conditions at once, for example, the prompt to describe the image, a base color to start from, a user-provided mask, a generated mask from a user-provided text, the computed depth map of the background image, or a user provided image. The mask can be applied to the areas of the image to be replaced. The strength of the various conditions can be configurable through a series of sliders that instruct the image generator to take into account one condition more than others.

Co-Modulated GAN (CoModGAN) generates diverse and consistent contents to small-scale inpainting, and large-scale image completion by embedding both conditional and stochastic style representations. Conditional style representation is a type of learned styled representations embedded from a conditional input to enhance an output. Stochastic style representation is used for large-scale image completion and is able to produce diverse results even when both input image and input mask are fixed.

At operation 370, the generated image can be added to the neural scene graph, such that the generated image is represented as a new node in the scene graph (e.g., a tree). The addition of the new node for the new image can cause modifications to other existing features represented by nodes in the scene graph. The scene graph can describe elements of the original image. The system can add the image for the object to the scene graph.

A scene graph is a way of describing a visual scene with a data structure that encodes object instances, attributes of the objects, and relationships between the objects. The objects, attributes and relationships can be encoded as tuples, and utilizing nodes and edges between nodes. Scene graphs can represent all the objects (e.g., person, car, plane, building, clouds, trees, mountain, etc.), attributes of objects (e.g., size, color, shape, orientation, object state, etc.), and relationships between objects (e.g., relative position, motion, etc.) in an image. For example, "person driving a car", "silver plane over white clouds", "man wearing a brown hat", "woman holding an open umbrella", etc.). Each object of a scene graph can also be associated with a region of the visual image.

In various embodiments, a neural scene graph links text-to-image prompts, the seeds and word clouds of the prompts, as well as non-generative image edits, and represents the non-destructive relationships between the outputs (e.g., a composite).

In various embodiments, a scene graph can be broken up into scene subgraphs. The scene graph and scene subgraphs (also subscene graphs) can depict the connected nature of the objects in the image.

In various embodiments, a scene subgraph could be created from a list of text characters and the associated calculated masks, combined or not combined with a text prompt, that leads to the generation of text characters realistically composited into the scene. For example, such a set of characters could be: "A", "D", "O", "B", "E", the base color could be "red", the prompt could be "graffiti on a wall", and the background image can be a photograph/digital image of a wall in perspective. The composition can compute the masks for the characters, predict the depth map of the wall and calculate perspective, correctly project the characters' masks on the wall using the perspective calculated in the previous steps, and then use the text prompt to individually generate each character starting from the base color (e.g., red), with the associated projected mask, and naturally blending the character onto the wall.

In various embodiments, the subgraph could be created from a group of vector elements with individual raster representations and masks (for example a logo, but also standard text rendered without effects applied). The composition can predict the depth map of the background image, correctly project the vector elements' masks using the depth map created in the previous step, and then generate the logo or the text image starting from the base color, with the associated projected mask, and naturally blending the logo or the text image into the background image.

Scene graphs and scene subgraphs can capture the detailed semantics of visual scenes by explicitly modeling objects, attributes of objects, and relationships between objects, and can provide a structured representation of the visual scenes. These details can be captured as (object, attribute) tuples and (object, relationship, object) tuples, where the tuples can be related to the image scene through detailed annotations of the images.

In various embodiments, each part of the scene can be generated separately and added to the scene graph, as part of the composite. The addition of each new image (e.g., object) can cause masking of the background and previously inserted images (objects), where the order of image insertion and graph modification can matter.

In various embodiments, the generation of a background, a hero image or sub-parts of the scene (neural composite) using a collection of text prompts can be implemented. These text prompts along with a resulting image output can be part of a neural scene graph that links text prompts and the corresponding word clouds with the generated image output and represents the relationships between the output (composite). Each link and node in the neural scene graph can become an intelligent widget that the user can manipulate, either by editing the text, choosing different visual output alternatives, applying classical image operations (e.g., style transfer), or applying additional semantic operations. Semantic operations can include identifying attributes for each node/link (from the associated text prompts), and enabling the user to use a User Interface (UI) to manipulate (e.g., through sliders) such attributes. For example, for the node "iron ceiling lamp", the attribute 'rustiness' can be identified and can be modified by the user via a slider. For a person or creature object, sliders may be implemented for attributes such as height, weight, ornateness, shininess, featheriness, scaliness, fierceness, scariness, friendliness, happiness, etc. Such attribute controls may also be locked, for example, as parental controls to adjust age appropriateness, where people and creatures can be modified to appear happier, friendlier and cuter (i.e., less fierce, angry, and/or scary).

In various embodiments, some nodes can refer to a generation step (from the composite on the path so far), while other nodes could be classical 2D image manipulations (masks, select subject, select sky etc.). As an example, a tree can be represented as source_image (cat)→"select subject" node→generate "spacecat in picasso style". A generative node could be a word cloud/embedding that the user can navigate (versus a simple query).

At operation 380, the generated image can be combined with the original image 335 to form a composite image. The generated image can be incorporated as a foreground object or a background object. The generated image can be placed in the location indicated by the user through a mask and/or bounding box, where the generated object image can replace a portion of the original image. The system can add the image of the object to the scene image.

In various embodiments, the current context of the scene image can be considered as each new image (object) is added. This allows previously generated changes to influence subsequent additions and changes to maintain a coherent context to the generated scene. For example, if a background element is changed from a beach scene to a forest scene, the generative element for "bird" can be resampled conditioned on this new background image context, which can result in a change from a seagull to an owl. Similarly, a change of a person object from a wizard to a pirate can result in a change of a scroll associated with the person, for example, through an object-relationship-object tuple, from a spell to a pirate map. Images in the neural composite (scene image) can be influenced by the image's relationships with other elements in the composition (scene).

In various embodiments, users can restrict or emphasize the range/dimensions of variation during element resampling. For instance, a user can choose to regenerate the same element with a different texture. In diffusion models, this can be achieved by manipulating the model seed, e.g., the base color of the element, in conjunction with the input prompt. For example, the rustiness of an old weapon hanging on a wall or the lamp in the hut scene can be varied through modification of the starting color, a feature vector for rustiness and/or changes to the seed value along a rustiness feature axis.

In various embodiments, the added images (objects) can be blended into the scene using non-neural network-based processes (e.g., classical image operations). This can alter images at a pixel level to fit the scene without regenerating the image using a generative model. For example, smoothing edges to avoid discontinuous and artificial transition boundaries between objects.

In various embodiments, the background and each generated image can be stored in a different layer that can be locked or manipulated separately, as separate entities of the scene image. For example, the "owl" may be stored separately to avoid loss of the object's attributes when the scene and/or other object image(s) are resampled, and can allow separate manipulation of objects. Storing the seed value can also help in retaining the object's characteristics when regenerating/resampling. The ability to "lock" what is generated by remembering the seed value (version control of generation) can provide non-destructive neural compositing, and the locking of nodes in the neural scene graph.

In various embodiments, image layers, each including at least one object image, can be locked to control the extent of influence the image(s) in a layer and/or have on other images represented in a scene graph.

At operation 390, the revised scene image 395 including the incorporated object image(s) can be presented to the user for further additions and/or modification, where the process can return to operation 330 and prompt the user for more objects and descriptions. The system can provide the scene image to the user.

The final generated image 395 (e.g., output scene image) can be collapsed into a static image based on the overall image content and context, where the pixels of the static image can be stored for future reuse. In various embodiments, the seed value(s) used to generate the different images (e.g., objects) can also be stored to allow regeneration of the previously generated images, without unwarranted or undesired changes due to the nature of the generative model(s) implemented.

In some examples, these operations are performed by a computer system including a processor executing a set of codes to control functional elements of an apparatus. Additionally or alternatively, steps of the method 300 may be performed using special-purpose hardware. The operations can be performed according to the methods and processes described in accordance with aspects of the present disclosure. In some cases, the operations described herein are composed of various sub-steps, or are performed in conjunction with other operations.

One or more aspects of the apparatus and method further include identifying an original image, a scene graph describing elements of the original image, and a description of a modification to the original image, updating the scene graph based on the description of the modification, and generating a modified image using an image generation neural network based on the scene graph, wherein the modified image incorporates content based on the original image and the description of the modification.

The apparatus and method further include adding a node to the scene graph based on the description of the modification. The apparatus and method further include modifying a node of the scene graph based on the description of the modification. The apparatus and method further include generating a partial image corresponding to a node of the scene graph, and combining the partial image with the original image to obtain the modified image.

Some examples of the method, apparatus, non-transitory computer readable medium, and system further include identifying a mask indicating a region of the original image. Some examples further include generating a noise map based on the original image and the mask, wherein the output image is generated based on the noise map. In some aspects, the first new image is added as an initial node to a scene graph for incorporating the first new image into the original image.

Figure 4:
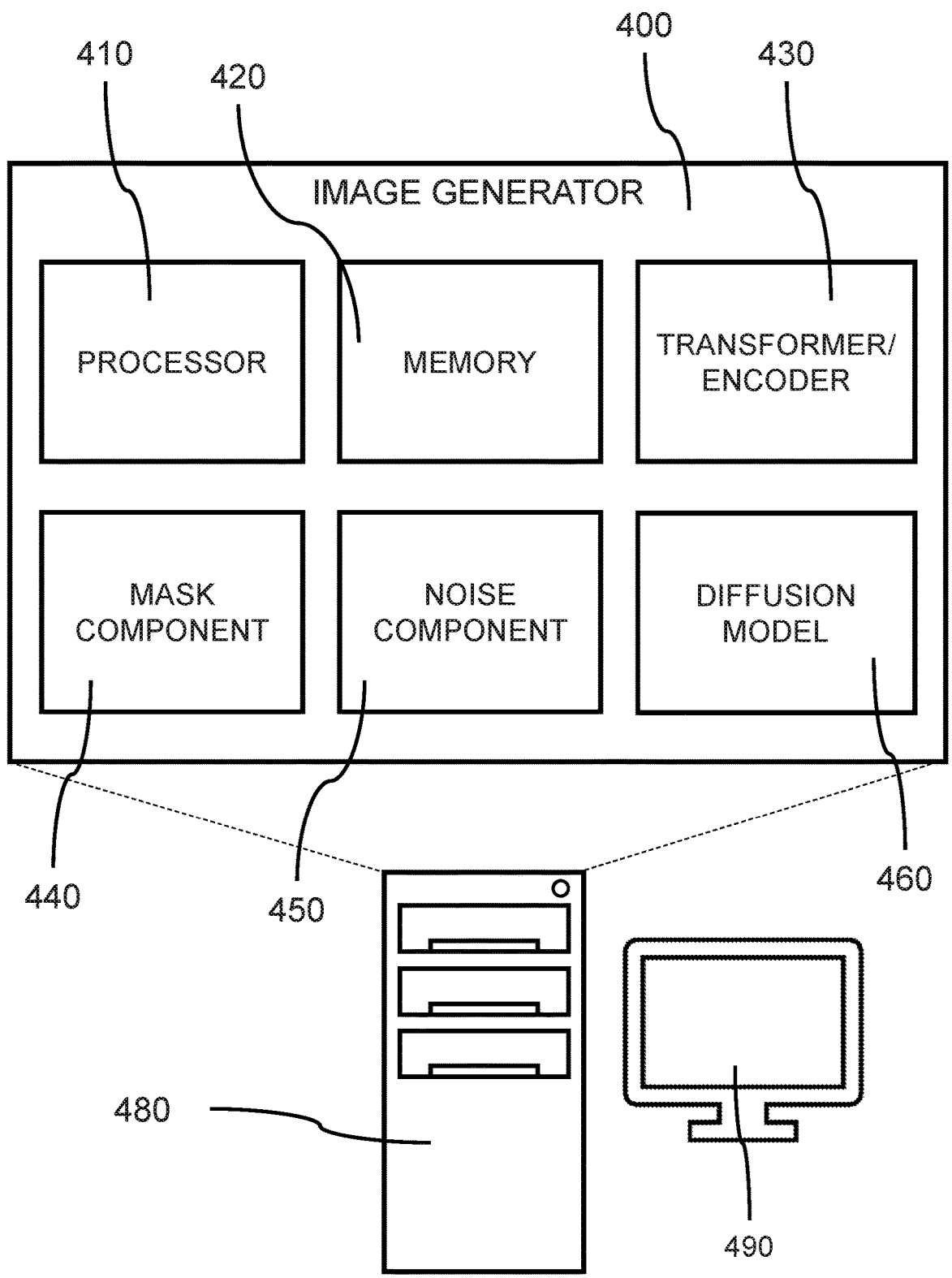
FIG. 4 shows a block diagram of an example of an image generator, according to aspects of the present disclosure.

FIG. 4 shows a block diagram of an example of an image generator, according to aspects of the present disclosure.

In one or more embodiments, an image generator 400 provides an original image 335 including original content and receives a text description indicating additional content to be added to a region of the original image.

In various embodiments, the image generator 400 can include a computer system 480 including one or more processors 410, computer memory 420, a transformer/encoder 430, a mask component 440, a noise component 450, and a diffusion model 460. The computer system 480 of the image generator 400 can be operatively coupled to a display device 490 (e.g., computer screen) for presenting prompts and images to a user 105, and operatively coupled to input devices to receive description input from the user.

In various embodiments, transformer/encoder 430 can generate a vector representing the description converted from the user's natural language text input. The description can include text indicating a desired edit to the original image 335, where the output scene image 395 is generated based on adjectives and prepositional phrases in the description that describes the desired features of an object or scene. In some aspects, a prompt from the image generator 400 includes an original image 335 presented to the user 105 on the display device 490 or communicated to the user's device 110.

In various embodiments, mask component 440 identifies a mask indicating the region of the original image. The mask component 440 can identify a region of the scene image to be modified or incorporate a new object image.

In various embodiments, noise component 450 generates a noise map based on the original image 335 and the mask, where the output image 395 is generated based on the noise map. In some examples, noise component 450 generates an iterative noise map for each of a set of output images with successively reduced noise to produce the output image.

According to some aspects, diffusion model 460 generates an output scene image 395 including the original content from the original image 335 and the additional content in the edited region using a diffusion model 460 that takes the vector generated from the description by the transformer/encoder 430 as input. In some aspects, the output scene image 395 combines additional content in a manner consistent with the original content. In some examples, diffusion model 460 iteratively produces a set of output images.

Diffusion models are a class of generative models that convert Gaussian noise into images from a learned data distribution using an iterative denoising process. Diffusion models are also latent variable models with latents, $z=\{z_t | t \in [0, 1]\}$, that obey a forward process $q(z|x)$ starting at data $x \sim p(x)$. This forward process is a Gaussian process that satisfies the Markovian structure. For image generation, the diffusion model is trained to reverse the forward noising process (i.e., denoising, $z_t \sim q(z_t|x)$). In addition, a text embedding from the natural language processor (NLP) can be used as a conditioning signal that guides the denoising process. A text encoder can encode the input text of the description into text embeddings, where the diffusion model maps the text embedding into an image.

In various embodiments, the computation and parameters in a diffusion model take part in the learned mapping function which reduces noise at each timestep (denoted as F). The model takes as input x (i.e., noisy or partially denoised image depending on the timestep), the timestep t, and conditioning information the model was trained to use. In some cases, the conditioning information can be a text prompt (e.g., TP, " ", and AP are text prompts). Classifier-free guidance is a mechanism to vary and control the influence of the conditioning on the sampled distribution at inference. In some cases, the conditioning can be replaced by the null token (i.e., the empty string, " ", in case of text conditioning) during training. A single scalar can control effect of the conditioning during inference.

Some examples of the method, apparatus, non-transitory computer readable medium, and system further include iteratively producing a plurality of output images. Some examples further include generating an iterative noise map for each of the plurality of output images with successively reduced noise to produce the output image.

Embodiments of the disclosure utilize an artificial neural network (ANN), which is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the nodes processes the signal and then transmits the processed signal to other connected nodes. In some cases, the signals between nodes comprise real numbers, and the output of each node is computed by a function of the sum of the node's inputs. In some examples, nodes may determine their output using other mathematical algorithms (e.g., selecting the max from the inputs as the output) or other suitable algorithms for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the layer's inputs. The initial layer is known as the input layer and the last layer is known as the output layer. In some cases, signals traverse certain layers multiple times.

In various embodiments, a stable diffusion model can be used as the base generative model, and masked image synthesis method with stochastic differential equations may be used as a baseline. Note that the same hyperparameters (i.e., noise strength, total diffusion steps, sampling schedule, classifier free guidance strength C) can be used.

In various embodiments, the text encoder can be a generic large language model pre-trained on text-only corpora, or a custom-trained text encoder.

Figure 5:
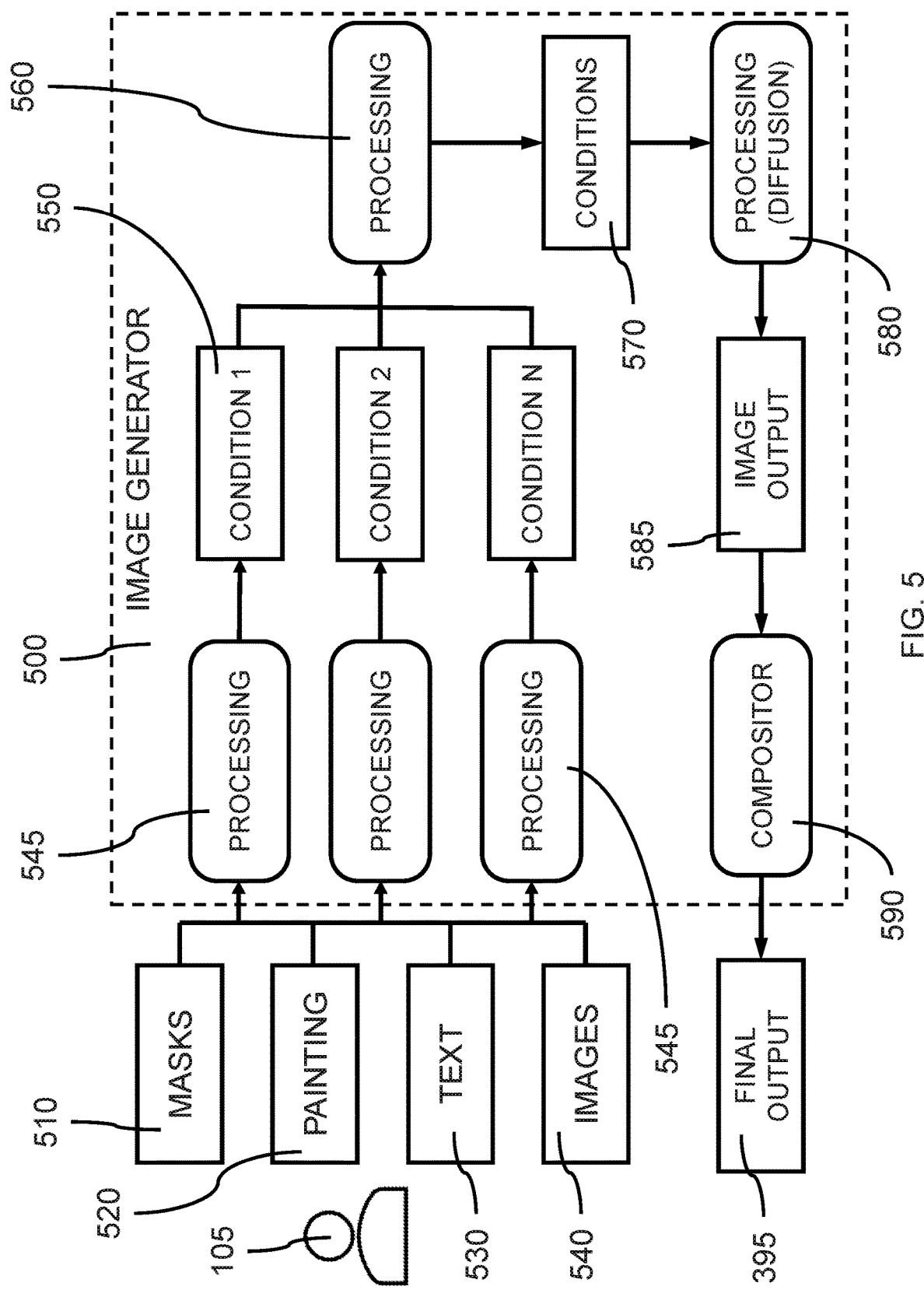
FIG. 5 shows a block diagram illustrating an example of a neural scene graph architecture, according to aspects of the present disclosure.

FIG. 5 shows a block diagram illustrating an example of a neural scene graph architecture, according to aspects of the present disclosure.

In various embodiments, a user 105 can enter various descriptors into an image generator 500, where the input can include masks 510 to identify regions of an image, a painting 520 of an object, a text description 530 of the object, and/or image(s) 540 of an object. The images 540 can include user-provided images, generated images, and stock images, where the images 540 may be stored in a computer memory. The images 540 can be connected to the scene graphs, or processed versions can be representative of the conditions, where inputs and condition can be the same thing. A vector encoding can be a representation of the condition.

In various embodiments, the user 105 can specify a style to be applied to the original image 335, where the style can be applied to the image to alter how the image is visually presented, for example, as a particular painter's style, as a cartoon, as a watercolor, a black-and-white or color sketch, as a photorealistic image, etc. The strength of the style may also be selected by the user, for example, using a scale (e.g., slider). The style may be selected by the user 105 from a plurality of stored styles usable by the image generator 500.

In various embodiments, each of the inputs 510, 520, 530, 540 can be processed in parallel via processing steps 545. For example, the text description 530 can be processed using a natural language transformer/encoder, the painting 520 and images 540 can be processed using a convolutional neural network (CNN), and the masks 510 can be processed by a neural network model to identify regions of the image or objects. The various inputs 510, 520, 530, 540 may be used by one or more of the processors to generate an embedded output, for example, an embedding vector. The processing can include preprocessing of the image(s) and text using non-neural network based graphics editing and text editing techniques.

In various embodiments, the various processing and embeddings can provide one or more conditions 550 that can be processed using further processes 560 to generate further conditions 570, where conditions are constraints that can be attached to the results of processing at each stage (e.g., the embedding vectors). The conditions 550, 570 can be a vector and/or a concatenation of vectors. A node can include the one or more conditions as attributes. For example, the text can be processed and represented as embedding vectors, and may have a condition of "Not" attached to exclude a specific topic or area from subsequent generation cycles that can be incorporated into the embedding vectors. Image input can be represented using a convolutional neural network (CNN) or masks 510 and then have associated conditions, such as how to apply the masks or where to place them. Additionally, processes 560 can consolidate the incoming conditions and/or translate them for input as conditions for the image generation.

According to various embodiments, the term "condition" can refer to original inputs (e.g., masks 510, painting 520, text description 530, and images 540), or to processed representation of the original inputs, such as conditions 550, or to a combined representation of multiple inputs such as conditions 570. These elements can be stored in association with a node of the scene graph.

Embodiments of the disclosure utilize a convolutional neural network (CNN), which is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that the filters activate in response to detecting a particular feature within the input.

Contrastive Language-Image Pre-Training (CLIP) is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

In some examples, convolution receives input size 3×3, kernel size 3×3, and convolution output is a single value. The convolution assigns a summed value to a center (i.e., the center of the 3×3). In image processing, convolution is the process of transforming an image by applying a kernel over each pixel and its local neighbors across the entire image. A kernel is a matrix of values whose size and values determine the transformation effect of the convolution process. Convolution involves placing a kernel matrix over each pixel of an image (ensuring that the kernel is within the image). Then, convolution multiplies each value of the kernel with the corresponding value of the pixel it is over. Convolution sums the resulting multiplied values and returns the resulting value as the new value of the center pixel. Convolution is repeated across the entire image. In some examples, the center element of the kernel is placed over the source pixel. The source pixel is then replaced with a weighted sum of the source pixel and nearby pixels.

In various embodiments, the conditions 570 (e.g., embedding vectors) can be inputted into an image generating model 580 (e.g., diffusion model, VAE, GAN, etc.) for generating a new image for a described object. The image generating model 580 can produce image output 585 (e.g., object image(s)), for example, by a diffusion model, that can be provided to a compositor 590 for incorporation into an input original image 335.

In various embodiments, one or more objects or features can be generated and added to the original image 335 through a generative process based on a textual description input by a user. The images of the objects can be generated by a generative model, and inserted into the image based on a neural scene graph. A scene graph can include nodes representing different elements in the image and edges between nodes that represent relationships (i.e., visual, spatial, or semantic relationships) between the nodes. In this manner multiple images of objects having user-described attributes and relationships can be added to the scene image. Each node of the scene graph can include meta-data associated with an element of the image such as a description, a location (e.g., a pixel mask or a central point and size), a semantic encoding of the element, etc.

In various embodiments, the compositor 590 can control the addition of object images, from the image output 585 generated by the image generating model 580, to the scene image through the creation of new nodes and edges in the scene graph. The compositor 590 can control additions and modifications to the scene graph to produce the final output (e.g., output scene image 395).

This, however, is different from a collage, where an image may be formed by placing one or more stock (predetermined/predefined) images into a background scene because the various object images are generated in a realistic, coherent way to depict user-selected features (i.e., attributes and relationships) rather than predetermined/predefined features, that may be in the stored images.

In various embodiments, this generation process can use a machine learning model designed to understand the background characteristics in terms of style (e.g., is it a photo or an abstract painting), depth and perspective, lighting and shadows—so when a generated image is composited into the scene, the generated image will inherit the capabilities/attributes of the currently computed background, for example, a bird rendered on a perspective plane can be automatically rendered smaller when positioned in the distant part of the scene. For example, a bird generated on top of an abstract painting would be generated as an "abstract bird".

Subsequent parts of the image can be generated and added to the scene in a non-destructive manner, where the seed value used for each of the previously generated images can be reused to avoid loss of the previously generated images of particular objects having specific attributes. For example, a user would not want the addition of the lamp to change a previously placed "bird" object from a crow to a parrot through the random aspect of the implemented generative model.

Figure 6:
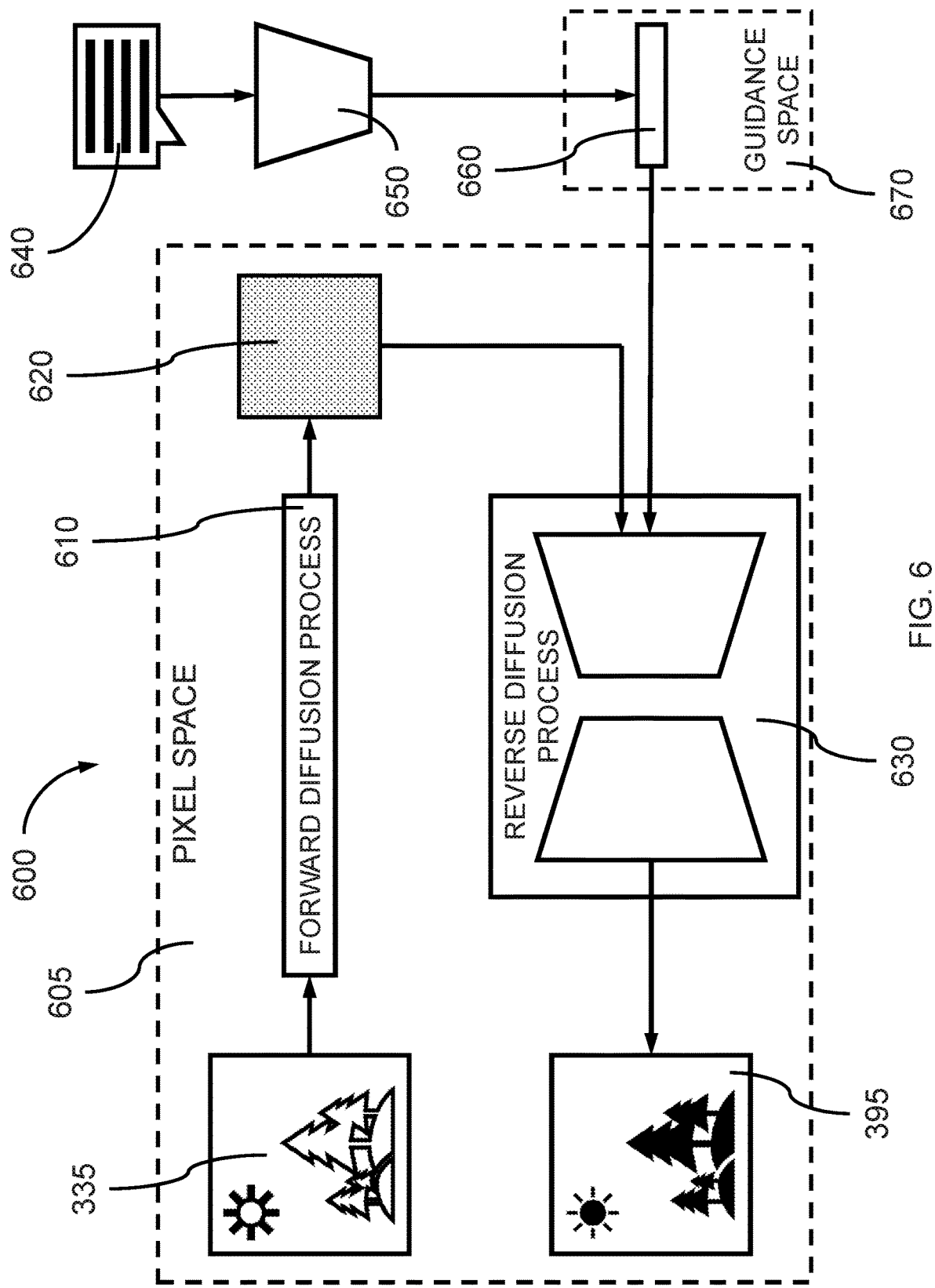
FIG. 6 shows a block diagram of an example of a guided diffusion model, according to aspects of the present disclosure.

FIG. 6 shows a block diagram of an example of a guided diffusion model, according to aspects of the present disclosure. The guided latent diffusion model 600 depicted in FIG. 6 is an example of, or includes aspects of, the corresponding diffusion model 460 described with reference to FIG. 4.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 600 may take an original image 335 in a pixel space 605 as input and apply a forward diffusion process 610 to gradually add noise to the original image 335 to obtain noisy images 620 at various noise levels.

Next, a reverse diffusion process 630 (e.g., a U-Net ANN) gradually removes the noise from the noisy images 620 at the various noise levels to obtain an output image 395. In some cases, an output image 395 is created from each of the various noise levels. The output image can be compared to the original image to train the reverse diffusion process 630.

The reverse diffusion process 630 can also be guided based on a text prompt 640, or another guidance prompt, such as a description, an image, a layout, a segmentation map, etc. The text prompt 640 can be encoded using a text encoder 650 (e.g., a multimodal encoder) to obtain guidance features 660 in guidance space 670. The guidance features 660 can be combined with the noisy images 620 at one or more layers of the reverse diffusion process 630 to ensure that the output image 395 includes content described by the text prompt 640. For example, guidance features 660 can be combined with the noisy features using a cross-attention block within the reverse diffusion process 630.

Figure 7:
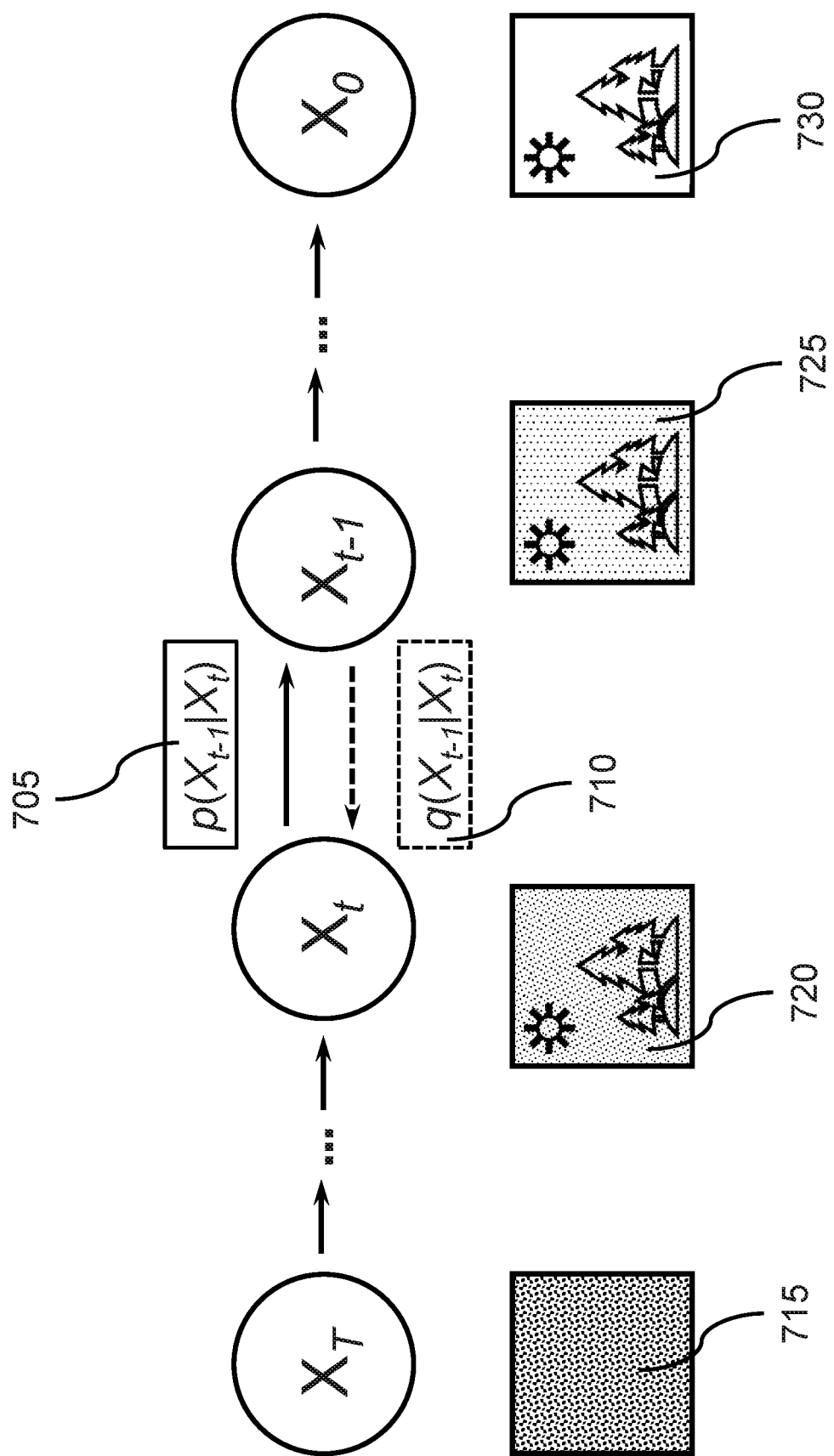
FIG. 7 shows a diffusion process, according to aspects of the present disclosure.

FIG. 7 shows a diffusion process according to aspects of the present disclosure.

According to embodiments of the present disclosure, the example includes forward diffusion process 705 and reverse diffusion process 710. The example further includes noisy image 715, first intermediate image 720, second intermediate image 725, and original image 730. Original image 730 is an example of, or includes aspect of, the same element described with reference to FIGS. 3 and 6.

As described above with reference to FIGS. 4 and 6, a diffusion model 460 can include both a forward diffusion process 705 for adding noise to an image (or features in a latent space) and a reverse diffusion process 710 for denoising the images (or features) to obtain a denoised image. The forward diffusion process 705 can be represented as $p(x_{t-1}|x_t)$, and the reverse diffusion process 710 can be represented as $q(x_t|x_{t-1})$. In some cases, the forward diffusion process 705 is used during training to generate images with successively greater noise, and a neural network is trained to perform the reverse diffusion process 710 (i.e., to successively remove the noise).

In an example forward process for a latent diffusion model, the model maps an observed variable $x_0$ (either in a pixel space or a latent space) to intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 710, the model begins with noisy data $x_T$, such as a noisy image 715 and denoises the data to obtain the $p(x_{t-1}|x_t)$. At each step $t-1$, the reverse diffusion process 710 takes $x_t$, such as first intermediate image 720, and t as input. Here, t represents a step in the sequence of transitions associated with different noise levels, The reverse diffusion process 710 outputs $x_{t-1}$, such as second intermediate image 725 iteratively until $x_T$ is reverted back to $x_0$, the original image 730. The reverse process can be represented as:

$$p_\theta(x_{t-1}|x_t) := \mathcal{N}(x_{t-1}; \mu_\theta(x_t, t), \Sigma_\theta(x_t, t)). \quad (1)$$

The joint probability of a sequence of samples in the Markov chain can be written as a product of conditionals and the marginal probability:

$$x_T \cdot p_\theta(x_{0:T}) := p(x_T) \Pi_{t=1}^T p_\theta(x_{t-1}|x_t), \quad (2)$$

where $p(x_T) = \mathcal{N}(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and i represents the generated image with high image quality.

Figure 8:
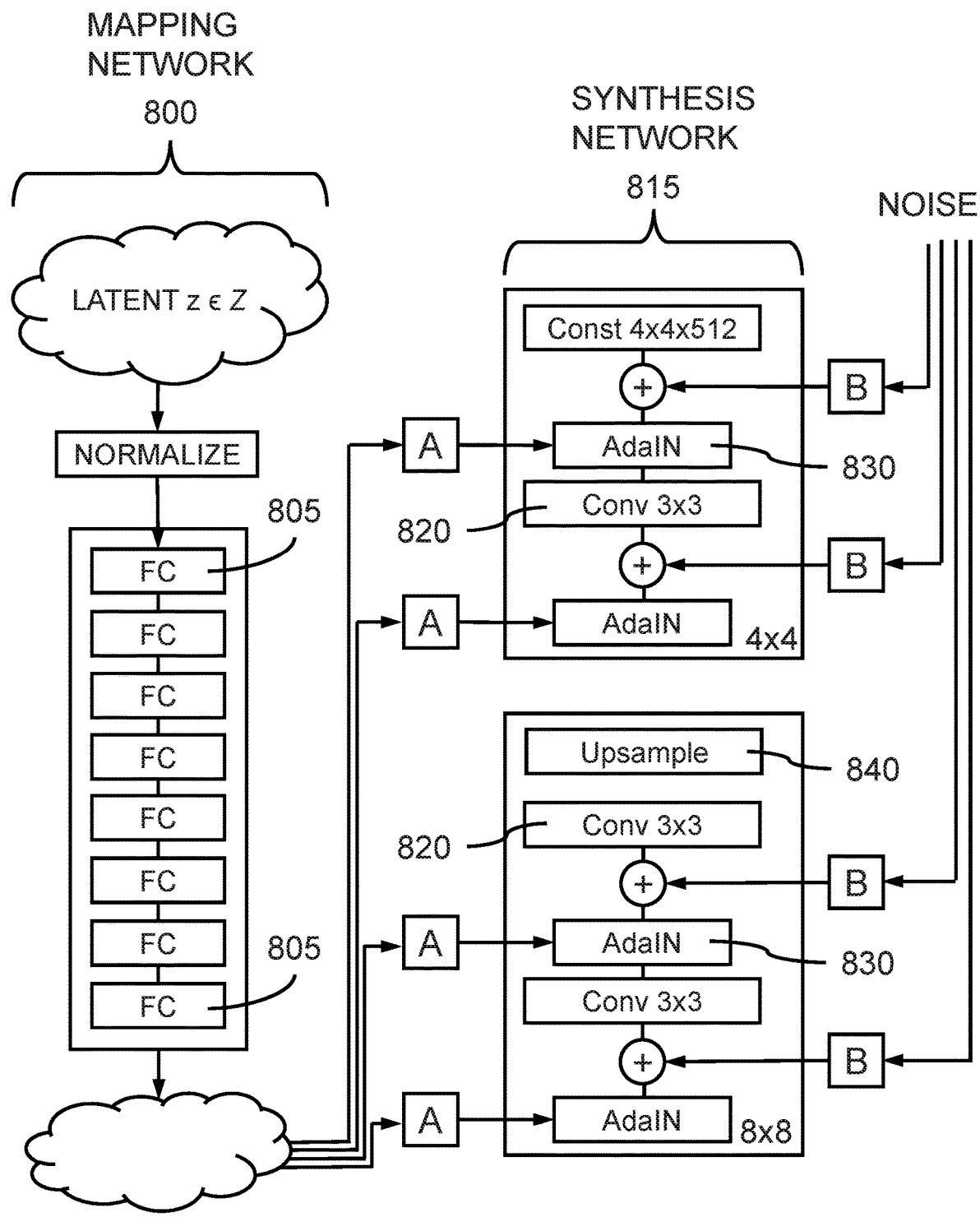
FIG. 8 shows an example of a guided generative adversarial network (GAN), according to aspects of the present disclosure.

FIG. 8 shows an example of a guided generative adversarial network (GAN), according to aspects of the present disclosure.

The GAN includes a mapping network 800 and a synthesis network 815. The mapping network 800 performs a reduced encoding of the original input and the synthesis network 815 generates, from the reduced encoding, a representation as close as possible to the original input.

GANs are a group of artificial neural networks where two neural networks are trained based on a contest with each other. Given a training set, the network learns to generate new data with similar properties as the training set. For example, a GAN trained on photographs can generate new images that look authentic to a human observer.

GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

The style generative adversarial networks (StyleGAN) is an extension to the GAN architecture that uses an alternative generator network including using a mapping network to map points in latent space to an intermediate latent space, using an intermediate latent space to control style at each point, and introducing noise as a source of variation at each point in the generator network.

In various embodiments, a mapping network 800 includes a deep learning neural network comprised of fully connected (FC) layers 805. In some cases, the mapping network 800 takes a randomly sampled point from the latent space as input and generates a style vector as output.

In various embodiments, the synthesis network 815 includes convolutional layers 820, adaptive instance normalization (AdaIN) layers 830, and an upsampling layer 840. The synthesis network 815 takes a constant value, for example, a constant 4×4×512 constant value as input in order to start the image synthesis process. The style vector generated from the mapping network 800 is transformed and incorporated into each block of the synthesis network after the convolutional layers 820 via the AdaIN operation. The AdaIN layers 830 first standardize the output of a feature map to a standard Gaussian, then add the style vector as a bias term. In some cases, the output of each convolutional layer in the synthesis network is a block of activation maps. In some cases, the upsampling layer 840 doubles the dimensions of input (e.g., from 4×4 to 8×8) and is followed by a convolutional layer 820.

In various embodiments, Gaussian noise is added to each of these activation maps prior to the AdaIN operations. A different sample of noise is generated for each block and is interpreted using per-layer scaling factors. In some examples, the noise Gaussian introduces style-level variation at a given level of detail.

Figure 9:
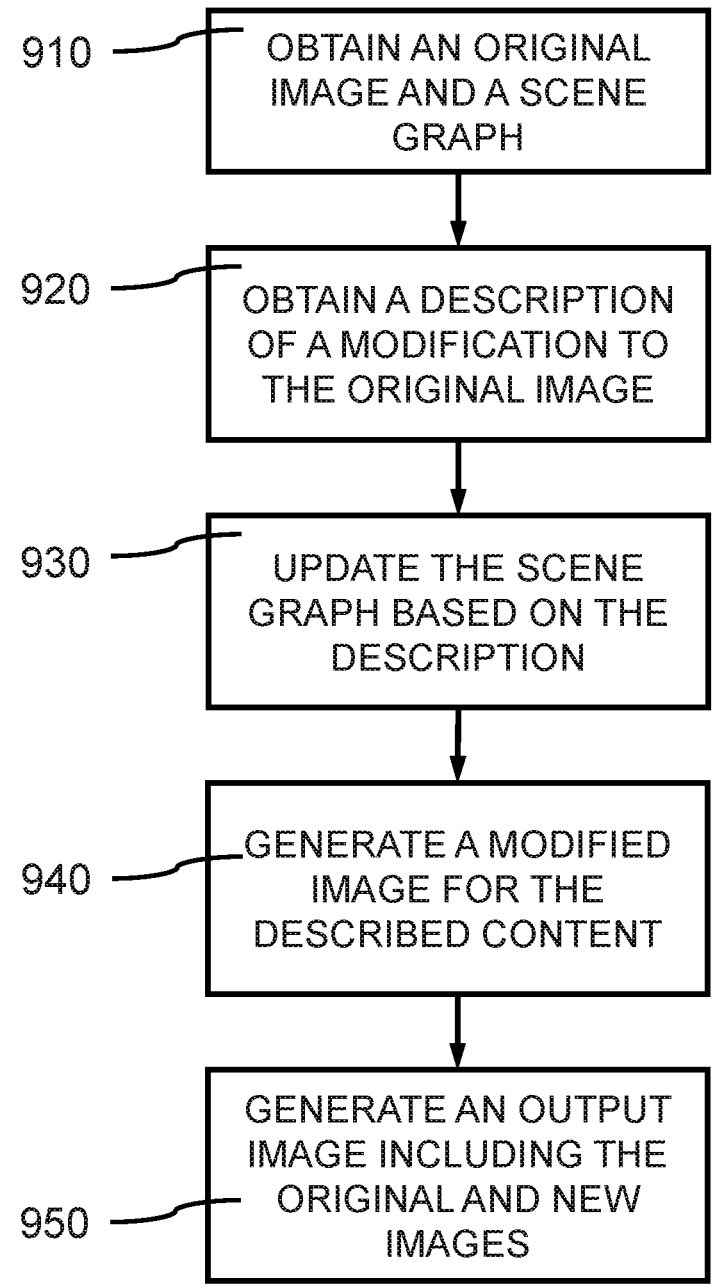
FIG. 9 shows a flow diagram of a method of incorporating generated images into a scene, according to aspects of the present disclosure.

FIG. 9 shows a flow diagram of a method of incorporating generated images into a scene, according to aspects of the present disclosure.

At operation 910, an original image including original content can be obtained, for example, from a user as input, identified by a user from one or more pre-existing or pre-generated images, or generated based on a description provided by a user. A plurality of pre-existing or pre-generated images may be stored and cataloged, for example, in a database, for reference, identification, and retrieval by a user. The original image can include original content and a description indicating additional content to be added to the original image. The original content can include foreground objects and background objects that form a scene.

In various embodiments, an original image can be obtained from a remote computer system through the cloud, where the original image can be obtained from a user providing the image to be modified, the original image can be obtained from available stock images, or the image may be obtained from the image generator by generating the original image. The original image can be input to the image generator for processing.

In various embodiments, the original image can be associated with a scene graph that is obtained with the image. The scene graph may be stored with the image as metadata or separately. The scene graph can provide a description of the content in the original image.

At operation 920, a description indicating a modification to the original image, including changes to the original image or additional content to be added to the original image, can be obtained. The description can be obtained from a user from a remote user device or database. The description can be a text description provided by a user, where the description can provide attributes of the content to be added to the original image and/or changed in the original image. The description can include a mask indicating the region of the original image for placement of the added content, where the added content can be an object having attributes. The system can identify a description of content to be added from text, images, and masks obtained from a user.

At operation 930, a scene graph can be updated based on the description, where the scene graph can include a plurality of nodes connected by edges. The nodes can include descriptions of and information relating to objects, attributes, and relationships in the image. Scene graphs can represent all the objects (e.g., person, car, plane, building, clouds, trees, mountain, etc.), attributes of objects (e.g., size, color, shape, orientation, object state, etc.), and relationships between objects (e.g., relative position, motion, etc.) in an image.

In various embodiments, updating a scene graph can include adding a node representing a new object added to the image, or modifying a node by changing an attribute of an object present in the image. Updating a scene graph can also include modifying a node and/or edge by changing the relationship between two or more objects in the image, such that object positions (e.g., location, orientation, pose, etc.) change relative to each other. The modification to the original image can be stored as information in one or more nodes.

At operation 940, a new image can be generated based on the description of the content to be added, where the new image can be a first new image or a subsequent image. The new image can be a modification of the original image, where aspects of the original image can remain the same. A partial image corresponding to a node (e.g., object) of the updated scene graph may be generated, and the partial image combined with the original image to obtain the modified image.

In various embodiments, the new image can be generated using a text-to-image diffusion model for incorporation into the original image. The system can generate a new image for the described modification or content. The modified image can be generated using an image generation neural network based on the updated scene graph, wherein the modified image incorporates content based on the original image and the description of the modification stored in the modified scene graph.

At operation 950, an output image can be generated including the original content from the original image and the first new image. The user can specify where in the original image the new image should be placed, for example, by placing a mask or bounding box at the desired location in the original image. The bounding box can indicate a size of the new image/additional content to be generated and added at the specified location. The system can generate an output image including the original and new images.

The output image can be generated by compositing involving combining multiple new images together in the original image, where the new images can be foreground objects and/or background objects. The content of the original image may be changed through the compositing operation.

In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations.

Figure 10:
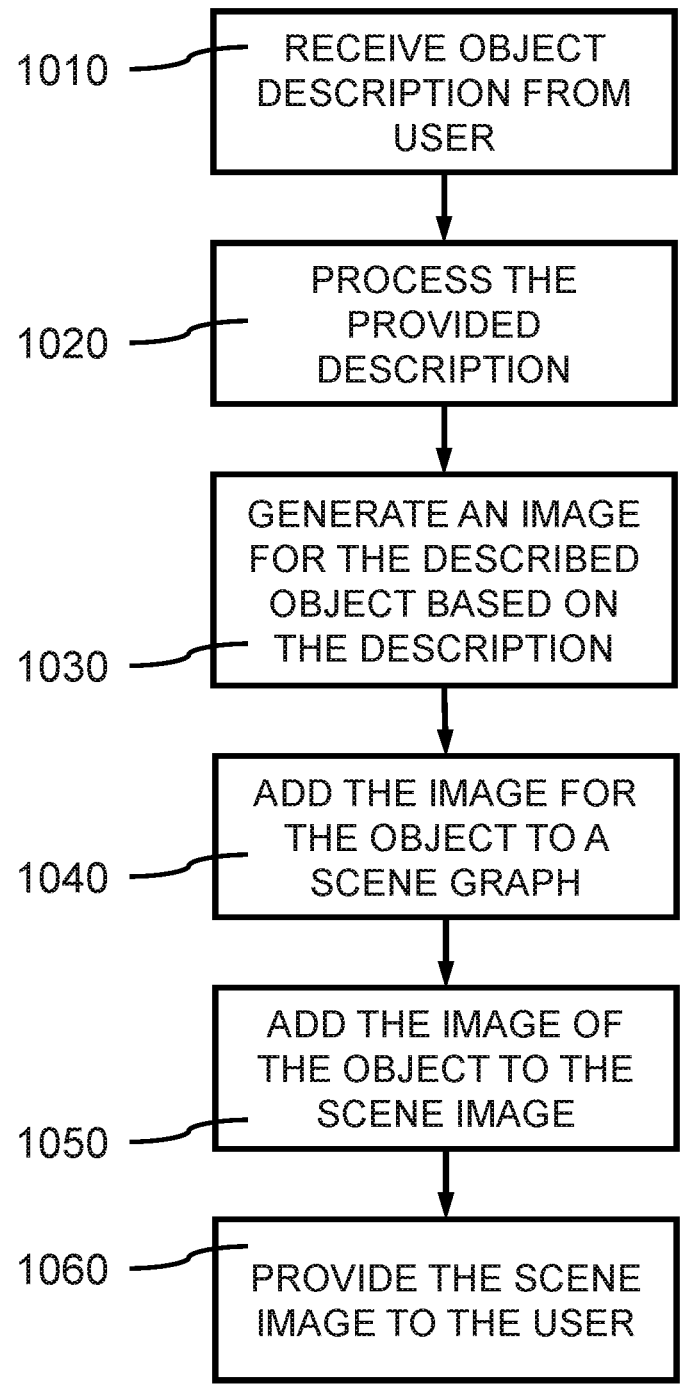
FIG. 10 shows a flow diagram of a method of incorporating generated images into a scene, according to aspects of the present disclosure.

FIG. 10 shows a flow diagram of a method of incorporating generated images into a scene, according to aspects of the present disclosure.

At operation 1010, an image generation system can receive a description of an object from a user. The description can identify the type of object, for example, a man, woman, car, plane, building, furniture, etc., and provide attributes of the object to be added to an original image, for example, color, size, shape, orientation, object state, etc.

In various embodiments, a text prompt that requests a description of the additional content can be presented to the user, and the description of the additional content can be received from the user. The user can also specify where the described object should be placed in an image, for example, using a mask or bounding box to specify a size and location for the object/image.

At operation 1020, the provided description can be processed, for example, a text description can be processed using a natural language transformer/encoder to generate a vector from the description. The vector can be used to guide the generation of the image for the described object.

Embodiments can utilize a word embedding model to encode a text prompt. A word embedding is a learned representation for text where words that have the same meaning have a similar representation. Glove, Word2Vec, GPT, BERT, and CLIP are examples of systems for obtaining a vector representation of words. GloVe is an unsupervised algorithm for training a network using aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the vector space. Word vectors are positioned in the vector space in a manner such that similar words are located nearby in the vector space. In some cases, an embedding space may include syntactic or context information in additional to semantic information for individual words.

At operation 1030, an image can be generated for the described object, for example, using an image generating model, where the image generating model may be a diffusion model. The vector generated from the description and the current state of the compositor (e.g., what is the current rendered image behind the object's bounding box) can be used to guide the image generation process. In various embodiments, a plurality of images that correspond to the provided description can be generated, and one or more of the generated images can be selected by the user. The generated images may be stored or deleted after the user makes a selection, where the selected, unselected, or all of the images may be stored, or the unselected images may be deleted.

In various embodiments, the image can be generated from a noise map and a vector based on the description, where an image generation model can utilize the noise map and description vector to generate an image having the described features and attributes.

In a non-limiting exemplary embodiment, the generative model can be a text-to-image model such as DALL-E 2, Imagen, or Stable Diffusion. In some cases, the model includes text-to-image blending and additional workflows. In various embodiments, elements in a neural composite image can be resampled on the fly when elements of the composition change.

Large text-driven diffusion models can include two modes of operation, e.g., text-to-image mode and image-to-image mode. Example models such as DALL-E 2, Imagen, and Stable Diffusion are text-driven diffusion models. The text-to-image mode includes creation of an image from random noise to match a text prompt. The image-to-image mode uses a starting image and a text prompt as additional input. The resulting image is generated by mapping from the starting image and partial random noise to a modified output image. In some cases, modification can be constrained in the image-to-image mode to affect a particular region by providing an additional input in the form of a spatial mask. The present disclosure describes systems and methods to perform an image-to-image edit. Embodiments of the disclosure include image-to-image edits that are localized by a mask to reliably follow the input text prompt. In some cases, the harmonization of the edit is not affected by the unchanged parts of the scene.

In various embodiments, elements to be resampled can be detected by representing the elements in an image as nodes in a graph (e.g., a tree), and representing the relationships between the nodes as edges, where when one node changes the node's neighbors can be regenerated via message-passing.

At operation 1040, the generated and selected image(s) can be added to a scene graph, where a node can be created for the generated image and inserted into the scene graph with edges connecting the new node to existing nodes in the scene graph. The node can be added to the scene graph based on the description of a modification, or a node of the scene graph can be modified based on the description of the modification. The edge connections formed between the new node and existing nodes can be determined by associations/relationships provided in the description, as well as, associations/relationships determined by the system. For example, the user may describe a first object as being associated/related to a second object (e.g., an umbrella being opened by a woman), whereas the system can recognize that the umbrella also has a relationship with rain present in the scene, which can be represented by another node.

In various embodiments, a partial image corresponding to a node of the scene graph can be generated and the partial image combined with the original image to obtain the modified image. A seed can be generated for the partial image in which the partial image is based on the seed, and in which the node can include the seed as an attribute. An additional partial image corresponding to the node can be generated based on a seed, and the additional partial image can be further combined with the previously modified image to obtain an additional modified image. One or more conditions for generating the partial image can be identified, where the node can include the one or more conditions as attributes. The first partial image can be resampled based on the description and the second partial image.

At operation 1050, the image of the object can be placed in the original scene image. In various embodiments, the user can specify where in the original image the new image should be placed, for example, by placing a bounding box at the desired location in the original image. The bounding box can also indicate a size of the new image/additional content to be generated and added at the specified location. The systems can add the image of the object to the scene image.

In various embodiments, the position, description, and relationships of the new object can determine one or more attributes of the generated image. For example, a "bird" placed in the middle of a scene may be identified as flying, due to the lack of other surfaces for the bird to be placed upon, and the images generated with a flying attribute, whereas the bird positioned and associated with a branch can be generated in a standing position. Sometimes, in order to preserve realism, the generative model will generate a supporting feature (e.g., a branch or beam) for the bird to sit on and place an image of the feature in the image adjacent to the bird.

In various embodiments, the new image can be added to the original scene image through compositing, where multiple new images may be added to the original image.

In various embodiments, samples in a neural composite can be conditioned on their relationships with other elements in the composition. For example, if a background element is changed from a beach scene to a forest, a generative element for a "bird" can be resampled based on this new background image. The result may be a change, for example, from generating a seagull to generating an owl.

In various embodiments, samples in the neural composite can be conditioned on a user's interests and preferences using techniques from collaborative filtering (inter-user) and/or personal edit history (intra-user). In text-to-image models, the objects of personalization can include prompt elements (e.g., post-fixes, conditioners, etc.), learned pseudo-tokens, and prompt seeds. For example, prior user modifications, for example, making previous people inserted into scenes appear friendlier or meaner can create an edit history that is incorporated into subsequent image generation processes. In text-to-image models, the objects of personalization can include things like prompt elements (post-fixes, conditioners, etc), learned pseudo-tokens, and prompt seeds.

In various embodiments, a personalization layer can be added to generation nodes by user text embeddings indexing previous user prompts, geo-specific terms, user community/social media terms, etc., which can serve to expand prompts to personalized queries, for example, "lunch" becomes "lunch schnitzel beer" for a German user, whereas "party" may become "party techno rave" based on user's previous prompts.

In various embodiments, users may be able to restrict/emphasize dimensions of variation during element resampling. For example, a user can choose to regenerate the same element (e.g., "bird", "table", "lamp", "door", etc.) with a different texture (e.g., wood, steel, glass, etc.). For example, in diffusion models this can be achieved by manipulating a background color, user-provided mask, generated mask, user-provided image for inspiration, and/or model seed in conjunction with the input prompt. Latent (i.e., hidden) dimensions in a generation may be identified, visualized as widgets and locked by the user, where, for example, the set of conditioning variables values may be locked to generate the same image.

In various embodiments, an edit history can be retained and can be reverted and/or cherry-picked at any stage of generation. This may be achieved through "version control" workflows that can represent history with a tree structure. Generative output can be "locked" via seeding, or even locked in their pixel manifestation and behave like a normal image in the composition process.

In various embodiments, users can import composite models as plugins into their workflow. The neural scene graph can serve as a "compositor", where the neural scene graph represents all of the elements combined in the scene image, including each of the added object images. The compositor can control the addition of images through the creation of new nodes and edges in the scene graph.

At operation 1060, the composite image combining the object image(s) and scene image can be provided to the user, for example, on a display screen. The user may determine whether to keep the generated composite image, add additional object(s), or modify aspects of the composite image, object image(s) and/or scene image. The system can provide the scene image to the user.

In various embodiments, each of the added images can be on a separate layer, that allows separate movement and repositioning of each of the object images within the scene image. The user can drag and drop the object images to a new location and position, which can be reflected in the node attributes, and the object image can be resampled to reflect changes in the associated attributes. Each new object can be placed in a separate layer when it is created.

In one or more embodiments, digital image editing tools can be blended with generative imaging by generating a background image and generating a first new image based on a first description, where the background image can have an associated scene graph. The scene graph can be updated to include a first node for the first new image and the first new image can be incorporated into the background image. A second new image can be generated based on a second description, and the scene graph can be updated to include a second node for the second new image. The second new image can be incorporated into the background image, and the first new image can be resampled using a stored seed value based on the second new image. The background image can be a stored image or the background image may be generated using a natural language processor and a diffusion model based on a description.

In various embodiments, a scene graph of an initial image can be identified, and an element of the scene graph can be identified. A new image corresponding to the element can be generated based on the scene graph using an image generation model, and the new image can be combined with the initial image to obtain a modified image through compositing.

In various embodiments, one or more attributes can be associated with the first new image through the first node, and one or more attributes can be associated with the second new image through the second node. The new images can be locked by storing a corresponding seed value used to generate the respective new images, and using the stored seed value to resample the new image, where the descriptions and/or seed values associated with the new images can be stored with the images corresponding nodes, thereby linking the description to the particular images. A color and a depth map for the images of the objects can also be stored with a node. The new images can be modified by manipulating an attribute associated with the new image, where the attributes associated with the new images may be manipulated by a user using a slider in a user interface.

Figure 11:
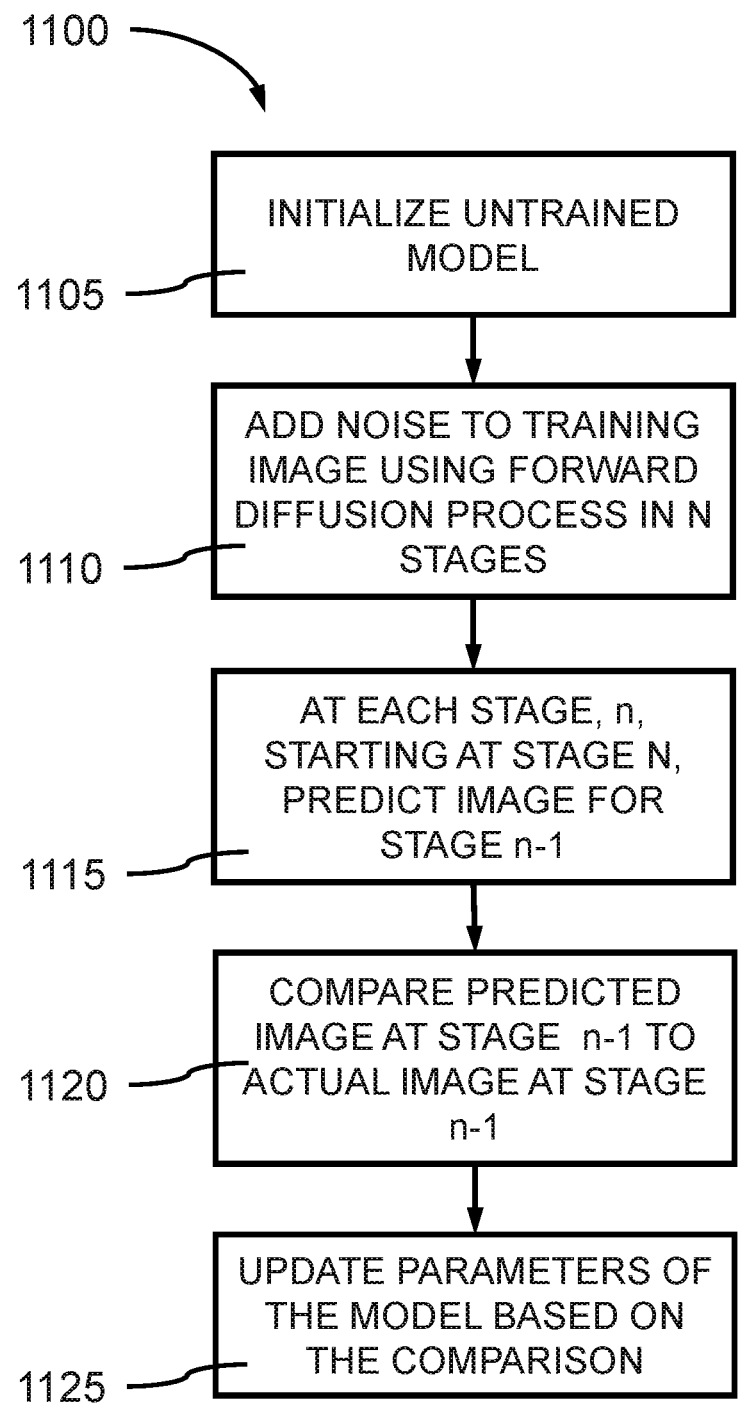
FIG. 11 shows an example of a method for training a diffusion model, according to aspects of the present disclosure.

FIG. 11 shows an example of a method for training a diffusion model according to aspects of the present disclosure.

The method 1100 represents an example for training a reverse diffusion process as described above with reference to FIG. 7. In some examples, these operations are performed by a system including a processor executing a set of codes to control functional elements of an apparatus, such as the apparatus described in FIGS. 4-5.

In various embodiments, certain processes of method 1100 may be performed using special-purpose hardware. Generally, these operations are performed according to the methods and processes described in accordance with aspects of the present disclosure. In some cases, the operations described herein are composed of various sub-steps, or are performed in conjunction with other operations.

At operation 1105, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, learning rate, and the like.

At operation 1110, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1115, the system at each stage n, starting with stage N, predicts image for stage n−1. For example, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1120, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 1125, the system updates parameters of the model based on the comparison. For example, parameters of a U-Net may be updated using gradient descent. Time-dependent parameters of the Gaussian transitions can also be learned.

Figure 12:
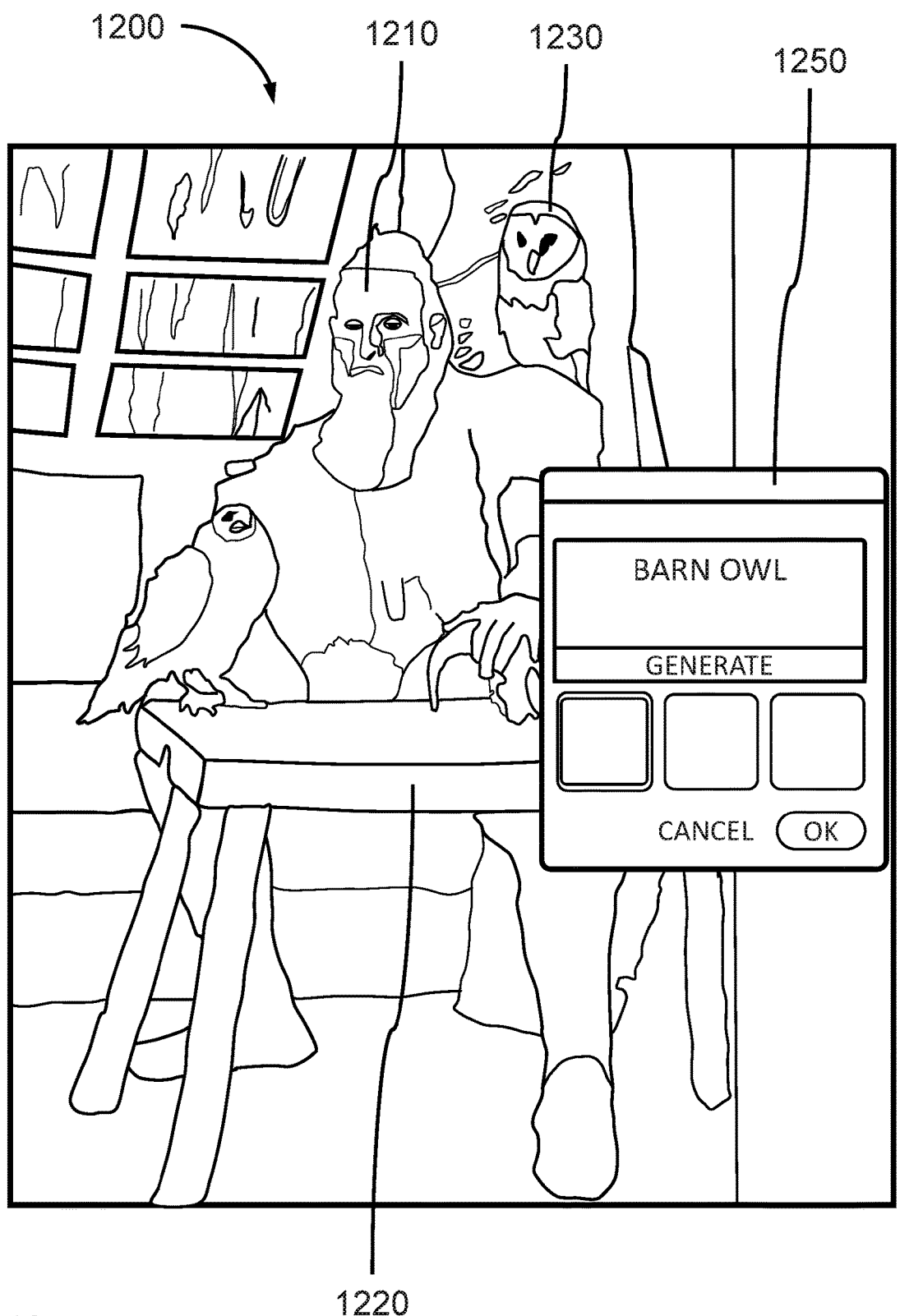
FIG. 12 shows an example of a user interface for editing an image based on a scene graph, according to aspects of the present disclosure.

FIG. 12 shows an example of a user interface for editing an image based on a scene graph, according to aspects of the present disclosure.

In various embodiments, the image 1200 may include multiple elements such as a warrior 1210, a table 1220, an owl 1230, etc. These elements can be represented by a scene graph including nodes associated with meta-data for each element. One element, such as the owl 1230, can be selected and selectively edited through a user interface 1250. The data associated with the owl can include a semantic embedding (i.e., an embedding of the phrase "a barn owl" and a relationship to the warrior (i.e., the owl is on the warrior's shoulder). A generative model can generate a new version of the owl based on the meta-data. The new version can be consistent with the other elements in the image, including the warrior 1210 and the background. For example, the newly generated owl 1230 can be depicted in a pose consistent with sitting on the warrior's shoulder.

Figure 13:
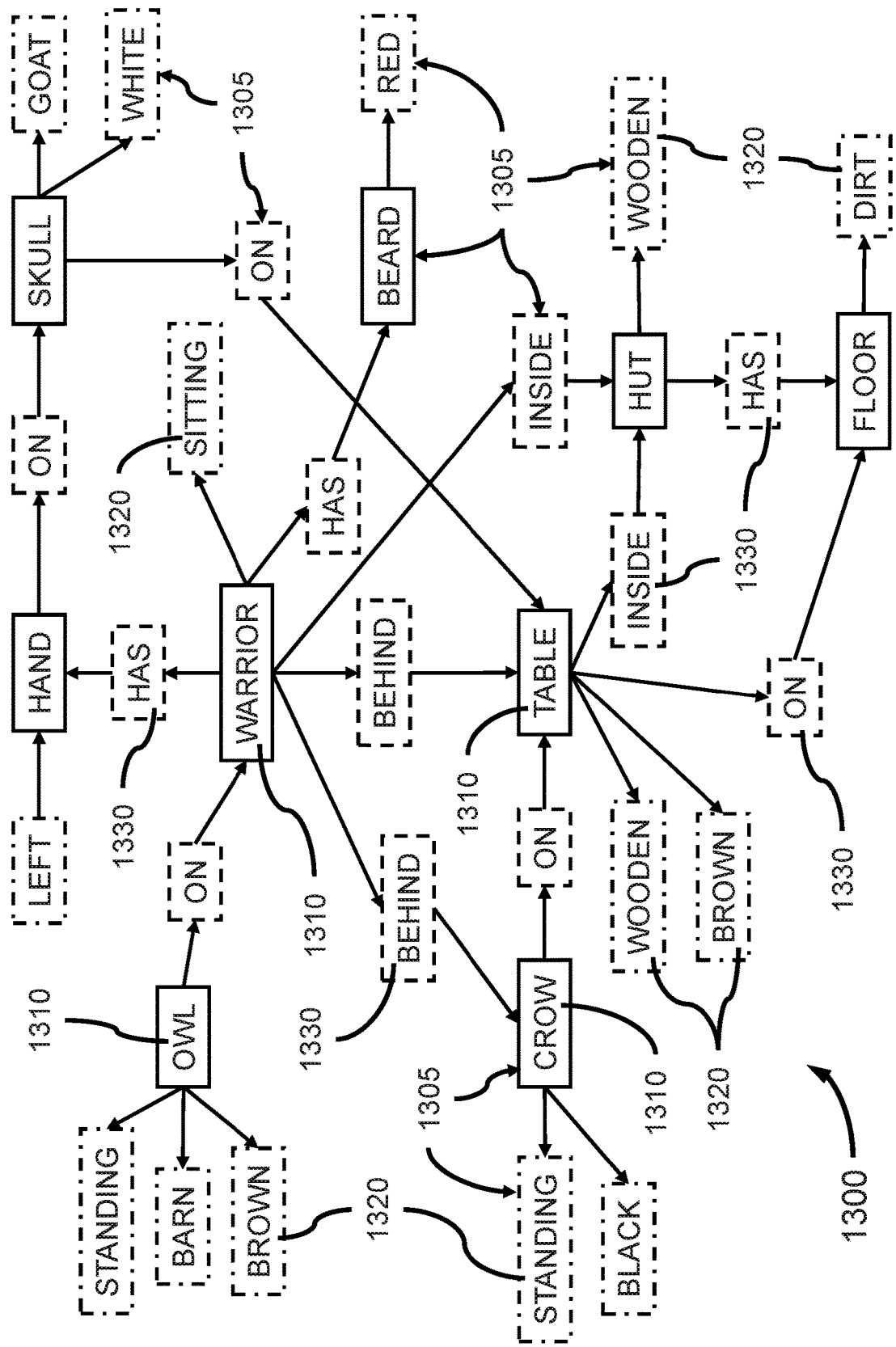
FIG. 13 shows an example of a scene graph for image generation of FIG. 12, according to aspects of the present disclosure.

FIG. 13 shows an example of a scene graph for image generation of FIG. 12, according to aspects of the present disclosure.

In various embodiments, a scene graph 1300 is a data structure that describes the contents of an image 1200. The scene graph 1300 can include nodes 1305 identifying objects 1310 (solid box) that have attributes 1320 (dashed-dot box) and relationships 1330 (dashed box) with other objects 1310, where the scene graph 1300 encodes the object instances, attributes of the objects, and relationships between the objects. The scene graph 1300 can be grounded to an image 1200 by associating each object instance 1310 of the scene graph 1300 to a region in an image, where bounding boxes may be used to identify the region(s).

In various embodiments, given a set of object classes C, a set of attribute types A, and a set of relationship types, R, a scene graph G can be defined as a tuple G=(O, E), where O={$o_1, \ldots, o_n$} is a set of objects and E⊆O×R×O is a set of edges. Each object 1310 has the form $o_i=(c_i, A_i)$ where $c_i \in C$ is the class of the object and $A_i \in A$ are the attributes 1320 of the object 1310.

In various embodiments, a seed value associated with the image generation of an object 1310 can be stored with the node 1305 of that object 1310. Regeneration of an image for an object in the scene can use the stored seed value to maintain the object image appearance, so regeneration of the object image does not produce a completely new version of the object. The seed value can be based on the attributes applied to the object.

Figure 14:
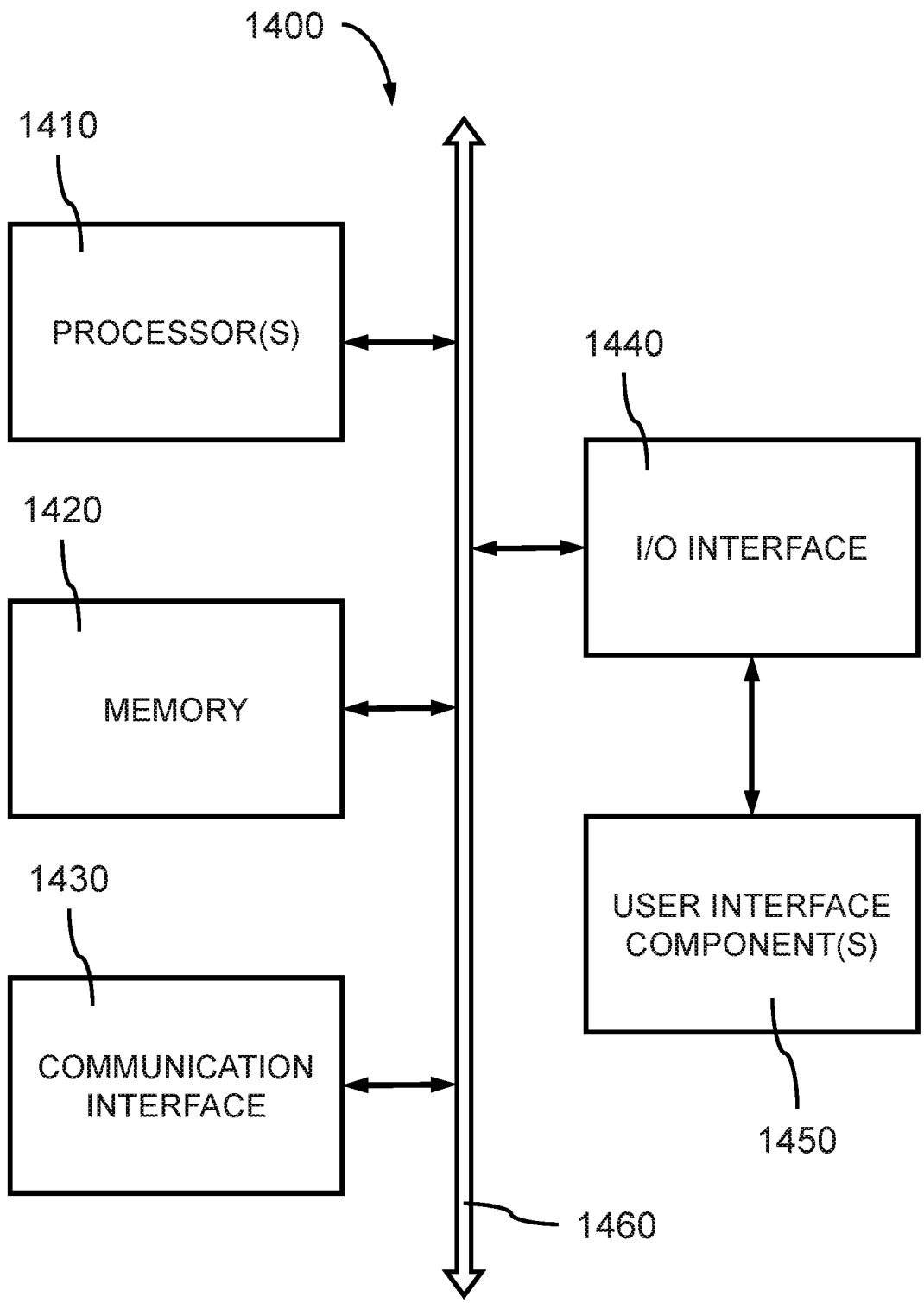
FIG. 14 shows an example of a computing device for image generation, according to aspects of the present disclosure.

FIG. 14 shows an example of a computing device for image generation according to aspects of the present disclosure.

In various embodiments, the computing device 1400 includes processor(s) 1410, memory subsystem 1420, communication interface 1430, I/O interface 1440, user interface component(s) 1450, and channel 1460.

In various embodiments, computing device 1400 is an example of, or includes aspects of image editing apparatus 120 of FIGS. 1 and 3. In some embodiments, computing device 1400 includes one or more processors 1410 that can execute instructions stored in memory subsystem 1420 for identifying an original image including original content and a prompt requesting additional content to be added to a region of the original image; generating an embedding vector representing the description; and generating an output image including the original content from the original image and the additional content in the region using, for example, a diffusion model 460 that takes the embedding vector as input.

In various embodiments, computing device 1400 includes one or more processors 1410. In various embodiments, a processor 1410 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1410 is configured to operate a memory array using a memory controller. In other cases, a memory controller is integrated into a processor. In some cases, a processor is configured to execute computer-readable instructions stored in a memory to perform various functions. In some embodiments, a processor 1410 includes special-purpose components for modem processing, baseband processing, digital signal processing, or transmission processing.

A processor 1410 may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor 1410, the functions may be stored in the form of instructions or code on a computer-readable medium.

In various embodiments, memory subsystem 1420 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor 1410 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1430 operates at a boundary between communicating entities (such as computing device 1400, one or more user devices, a cloud, and one or more databases) and channel 1460 (e.g., bus), and can record and process communications. In some cases, communication interface 1430 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1440 is controlled by an I/O controller to manage input and output signals for computing device 1400. In some cases, I/O interface 1440 manages peripherals not integrated into computing device 1400. In some cases, I/O interface 1440 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1440 or via hardware components controlled by the I/O controller.

According to some aspects, user interface component(s) 1450 enable a user to interact with computing device 1400. In some cases, user interface component(s) 1450 include an audio device, such as an external speaker system, an external display device such as a display device 490 (e.g., screen), an input device (e.g., a remote-control device interfaced with a user interface directly or through the I/O controller), or a combination thereof. In some cases, user interface component(s) 1450 include a GUI.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for neural compositing, comprising:
obtaining an original image, a scene graph describing elements of the original image, and a description of a modification to the original image;
updating the scene graph based on the description of the modification; and
generating a modified image using an image generation neural network based on the updated scene graph, wherein the modified image incorporates content, wherein the content is based on the original image and the description of the modification.

2. The method of claim 1, further comprising:
updating the scene graph by adding a node to the scene graph based on the description of the modification.

3. The method of claim 1, further comprising:
updating the scene graph by modifying a node of the scene graph based on the description of the modification.

4. The method of claim 1, further comprising:
generating a partial image corresponding to a node of the updated scene graph; and
combining the partial image with the original image to obtain the modified image.

5. The method of claim 4, further comprising:
generating a seed for the partial image, wherein the partial image is based on the seed, and wherein the node includes the seed as an attribute.

6. The method of claim 5, further comprising:
generating an additional partial image corresponding to the node based on the seed; and
combining the additional partial image with the modified image to obtain an additional modified image.

7. The method of claim 4, further comprising:
identifying one or more conditions for generating the partial image, wherein the node includes the one or more conditions as attributes.

8. The method of claim 7, further comprising:
generating an additional partial image corresponding to the node based on the one or more conditions; and
combining the additional partial image with the modified image to obtain an additional modified image.

9. The method of claim 1, wherein:
the image generation neural network is trained to generate the modified image using a diffusion training technique.

10. The method of claim 1, further comprising:
receiving an additional description of an additional modification to the original image;
updating the scene graph based on the description of the additional modification; and
generating an additional modified image using the image generation neural network based on the updated scene graph, wherein the additional modified image incorporates content based on the original image and the additional description of the additional modification.

11. The method of claim 10, further comprising:
generating a first partial image based on a description of the modification, wherein the modified image is based on the first partial image;
generating a second partial image based on a second description of a second modification, wherein the additional modified image is based on the second partial image; and
resampling the first partial image based on the description and the second partial image.

12. An apparatus for neural compositing, comprising:
a processor; and
a memory storing instructions and in electronic communication with the processor, the processor being configured to execute the instructions to:
obtain an original image, a scene graph describing elements of the original image, and a description of a modification to the original image;
update the scene graph based on the description of the modification; and
generate a modified image using an image generation neural network based on the updated scene graph, wherein the modified image incorporates content, wherein the content is based on the original image and the description of the modification.

13. The apparatus of claim 12, the processor being further configured to execute the instructions to:
update the scene graph by adding a node to the scene graph based on the description of the modification.

14. The apparatus of claim 12, the processor being further configured to execute the instructions to:
update the scene graph by modifying a node of the scene graph based on the description of the modification.

15. The apparatus of claim 12, the processor being further configured to execute the instructions to:
generate a partial image corresponding to a node of the updated scene graph; and
combine the partial image with the original image to obtain the modified image.

16. The apparatus of claim 15, the processor being further configured to execute the instructions to:
generate a seed for the partial image, wherein the partial image is based on the seed, and wherein the node includes the seed as an attribute.

17. A non-transitory computer readable medium storing code for image generation, the code comprising instructions executable by a processor to:
obtaining an original image, a scene graph describing elements of the original image, and a description of a modification to the original image;
update the scene graph based on the description of the modification; and
generate a modified image using an image generation neural network based on the updated scene graph, wherein the modified image incorporates content, wherein the content is based on the original image and the description of the modification.

18. The non-transitory computer readable medium of claim 17, the code further comprising instructions executable by the processor to:
update the scene graph by adding a node to the scene graph based on the description of the modification.

19. The non-transitory computer readable medium of claim 17, the code further comprising instructions executable by the processor to:
update the scene graph by modifying a node of the scene graph based on the description of the modification.

20. The non-transitory computer readable medium of claim 17, the code further comprising instructions executable by the processor to:
generate a partial image corresponding to a node of the updated scene graph; and
combine the partial image with the original image to obtain the modified image.

* * * * *